United States Patent
Hahn et al.

(10) Patent No.: US 10,667,189 B2
(45) Date of Patent: May 26, 2020

(54) METHOD AND DEVICE FOR TRANSMITTING AND RECEIVING DATA IN WIRELESS COMMUNICATION SYSTEM

(71) Applicant: LG ELECTRONICS INC., Seoul (KR)

(72) Inventors: Genebeck Hahn, Seoul (KR); Heejeong Cho, Seoul (KR); Eunjong Lee, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 16/065,052

(22) PCT Filed: Dec. 22, 2015

(86) PCT No.: PCT/KR2015/014102
§ 371 (c)(1),
(2) Date: Jun. 21, 2018

(87) PCT Pub. No.: WO2017/111185
PCT Pub. Date: Jun. 29, 2017

(65) Prior Publication Data
US 2018/0376394 A1  Dec. 27, 2018

(51) Int. Cl.
*H04W 36/08* (2009.01)
*H04W 76/10* (2018.01)
(Continued)

(52) U.S. Cl.
CPC ............ *H04W 36/08* (2013.01); *H04W 8/08* (2013.01); *H04W 24/10* (2013.01);
(Continued)

(58) Field of Classification Search
CPC ...... H04W 36/08; H04W 24/10; H04W 76/27; H04L 61/6022
See application file for complete search history.

(56) References Cited

U.S. PATENT DOCUMENTS

| | | | |
|---|---|---|---|
| 8,358,982 B2* | 1/2013 | Van Der Velde | ............................ H04W 36/0088 455/425 |
| 2013/0170435 A1* | 7/2013 | Dinan | ...................... H04L 45/50 370/328 |
| 2015/0373584 A1* | 12/2015 | Hong | .................... H04W 28/08 370/329 |

FOREIGN PATENT DOCUMENTS

| | | |
|---|---|---|
| KR | 10-2014-0079330 A | 6/2014 |
| KR | 10-2015-0045211 A | 4/2015 |
| WO | WO 2015/065129 A1 | 5/2015 |

OTHER PUBLICATIONS

3GPP TS 36.300, V13.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN)", Overall description; Stage 2, Release 13, Sep. 25, 2015, 256 pages.
(Continued)

*Primary Examiner* — Wei Zhao
(74) *Attorney, Agent, or Firm* — Birch, Stewart, Kolasch & Birch, LLP

(57) ABSTRACT

The present invention relates to a method and device for transmitting and receiving data in a wireless communication system. According to the present invention, provided is a method comprising a step of receiving, from a network node, a request message requesting an E-UTRAN radio access bearer (E-RAB) configuration for data transmission and reception of a mission critical service (MCS), wherein the request message includes indication information for
(Continued)

permitting transmission and reception of the data in at least one first measurement gap, when data of the MCS is generated in the at least one first measurement gap, transmitting, to the terminal, at least one of measurement gap information related to the at least one first measurement gap in which the indication information or the data is transmitted, and transmitting, to the terminal, the data in the at least one measurement gap.

11 Claims, 24 Drawing Sheets

(51) Int. Cl.
    *H04W 36/00*     (2009.01)
    *H04W 72/12*     (2009.01)
    *H04W 76/27*     (2018.01)
    *H04W 8/08*     (2009.01)
    *H04W 24/10*     (2009.01)
    *H04W 60/06*     (2009.01)
    *H04W 36/30*     (2009.01)
    *H04W 28/02*     (2009.01)

(52) U.S. Cl.
    CPC ....... *H04W 36/0088* (2013.01); *H04W 60/06* (2013.01); *H04W 72/12* (2013.01); *H04W 76/10* (2018.02); *H04W 76/27* (2018.02); *H04W 28/0252* (2013.01); *H04W 36/0022* (2013.01); *H04W 36/305* (2018.08)

(56) References Cited

OTHER PUBLICATIONS

Ericsson, "Signalling enhancements for measurement gap and inter RAT capability", 3GPP TSG-RAN WG2 #92, Tdoc R2-156783, Anaheim, USA, Nov. 16-20, 2015, 7 pages.

* cited by examiner

[Fig. 1]
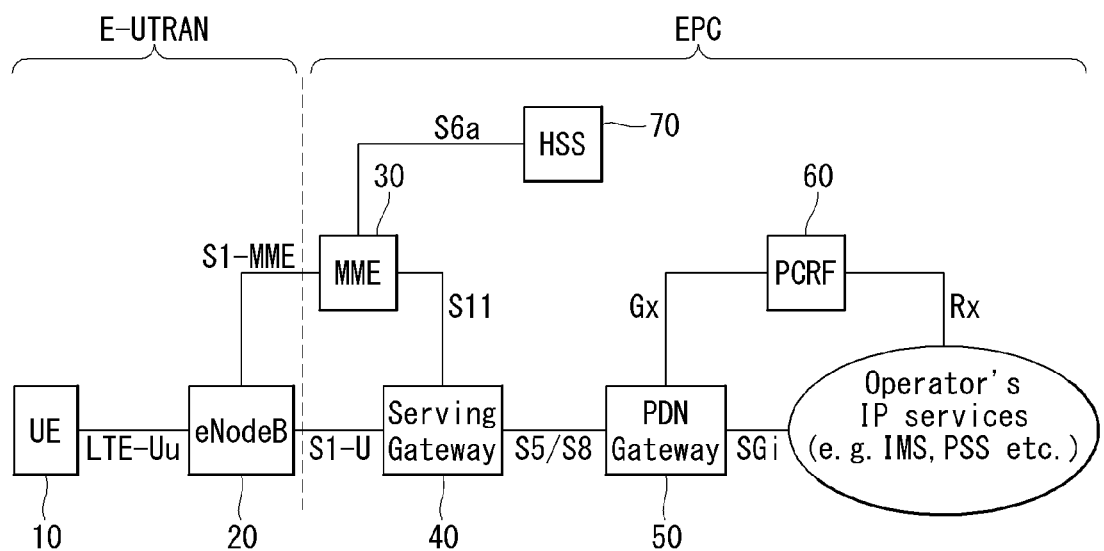

[Fig. 2]
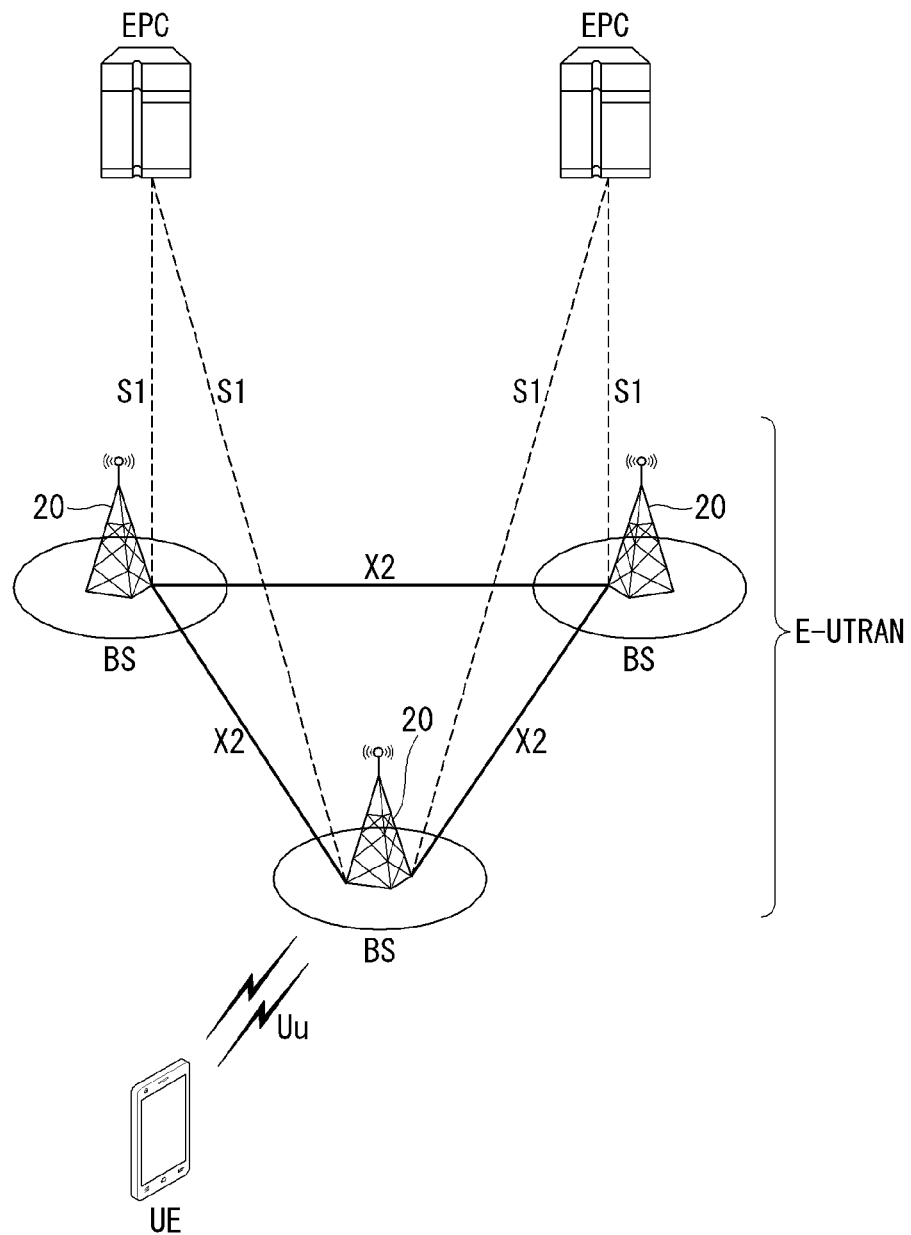

[Fig. 3]
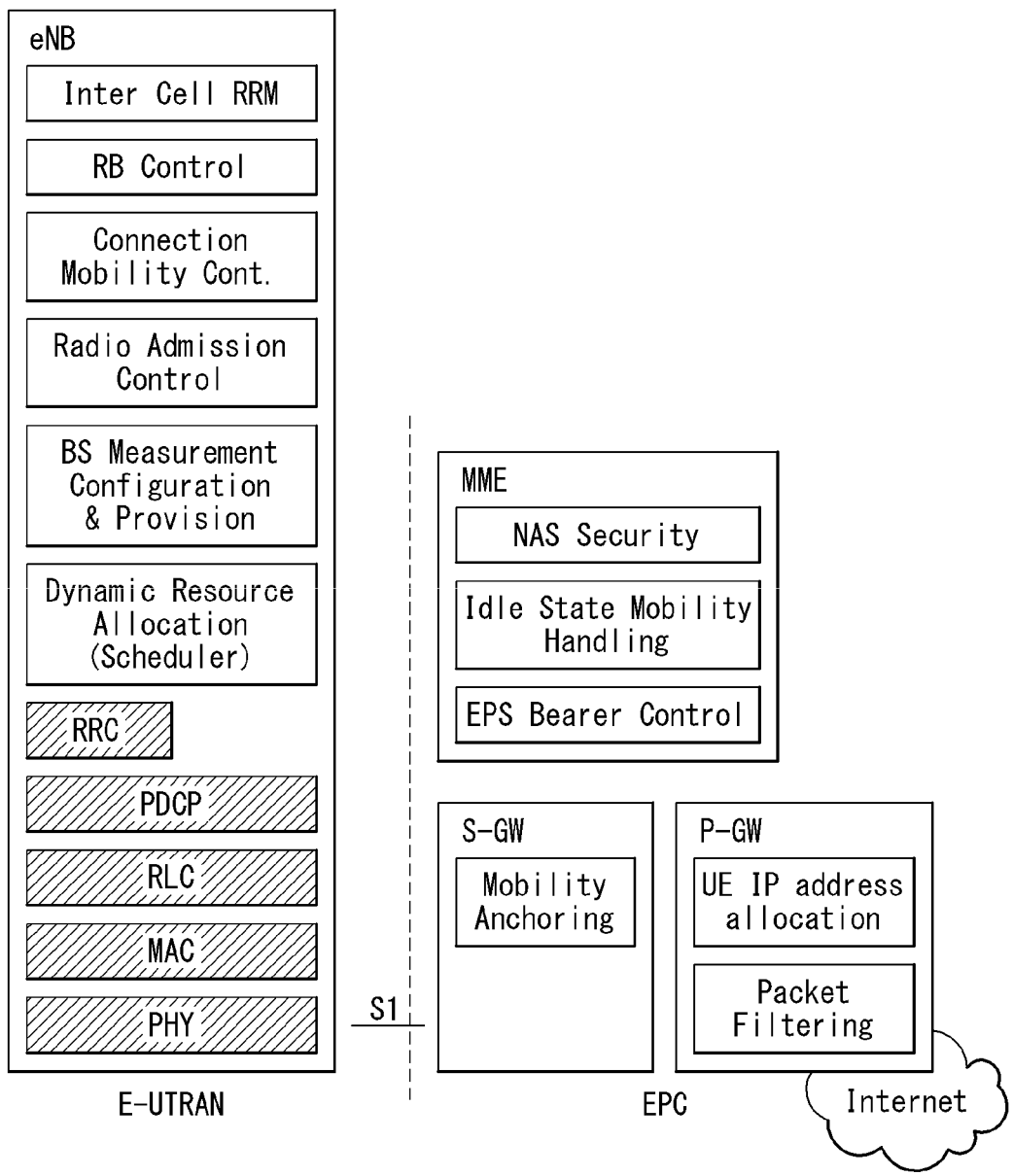

[Fig. 4]
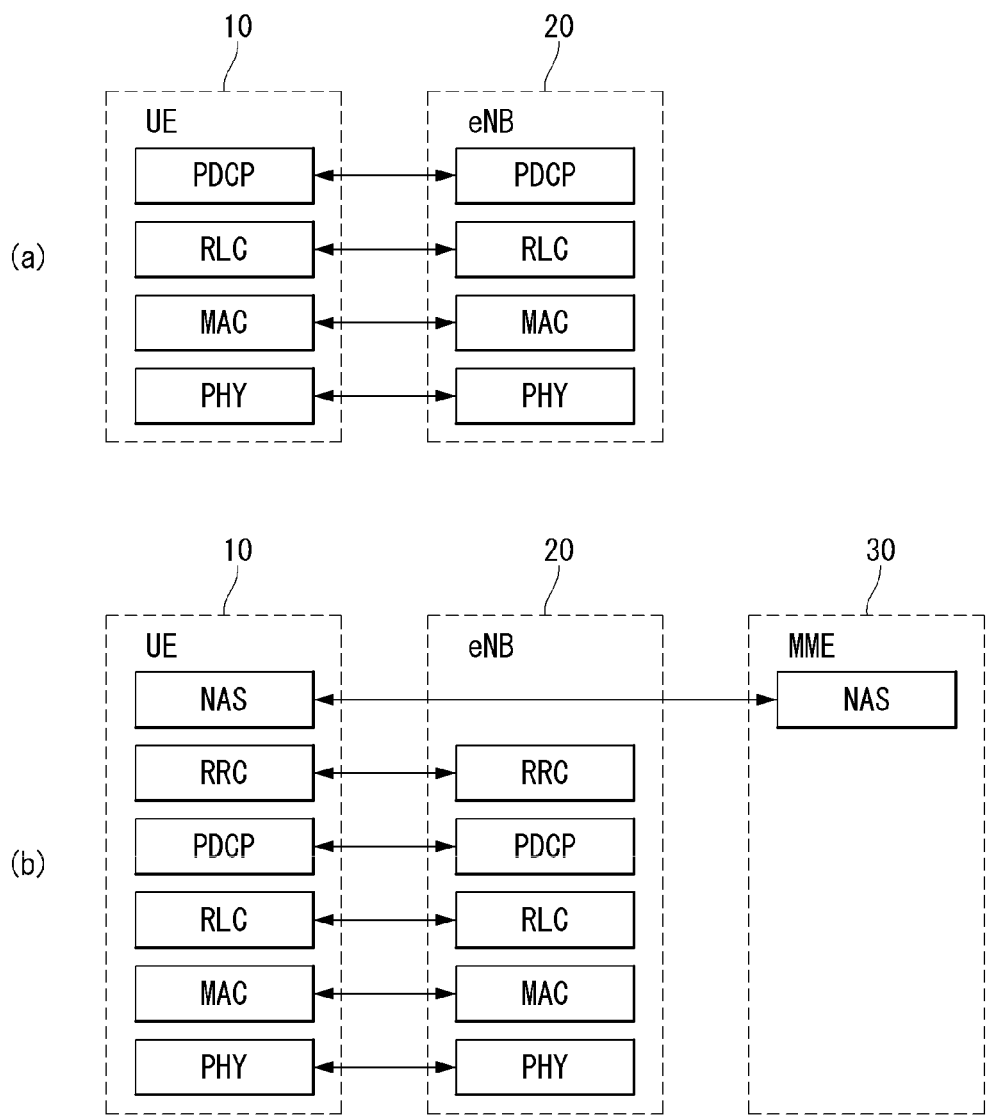

[Fig. 5]
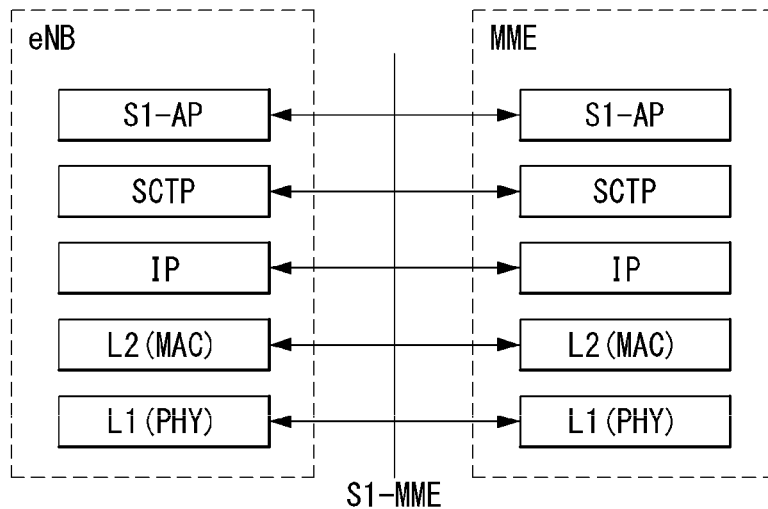
(a) control-plane protocol stack
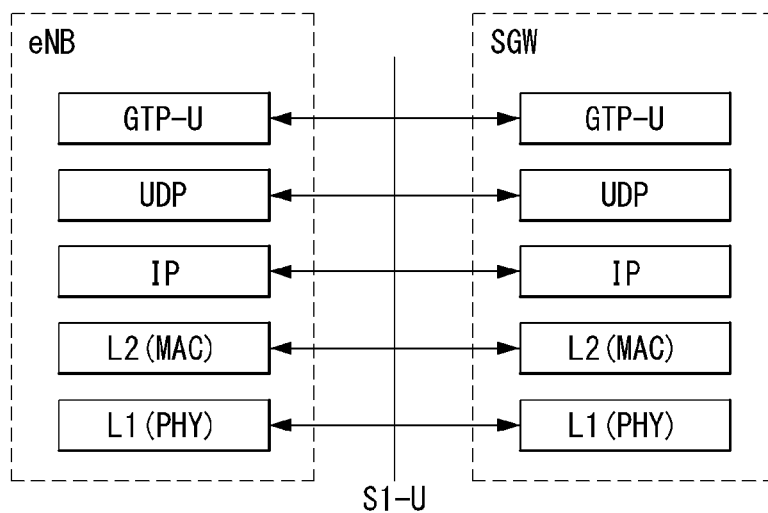
(b) user-plane protocol stack

[Fig. 6]
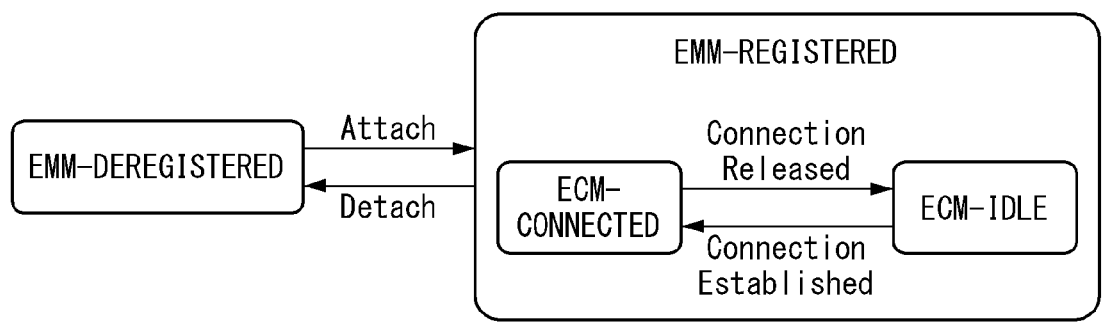

[Fig. 7]
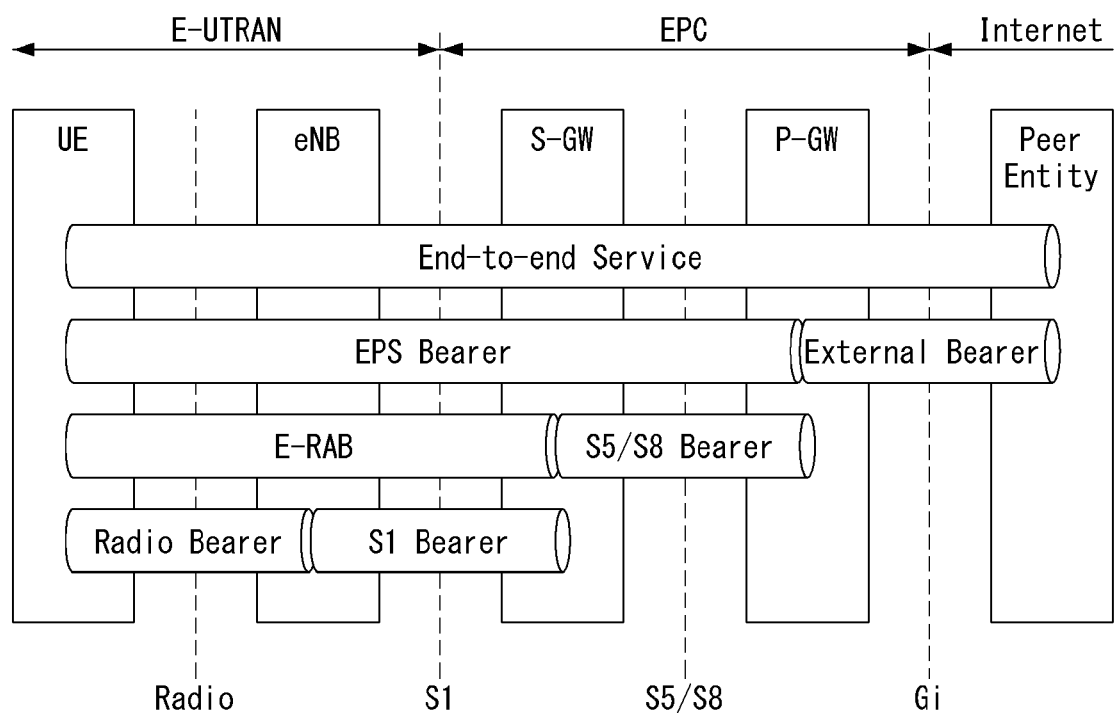

[Fig. 8]
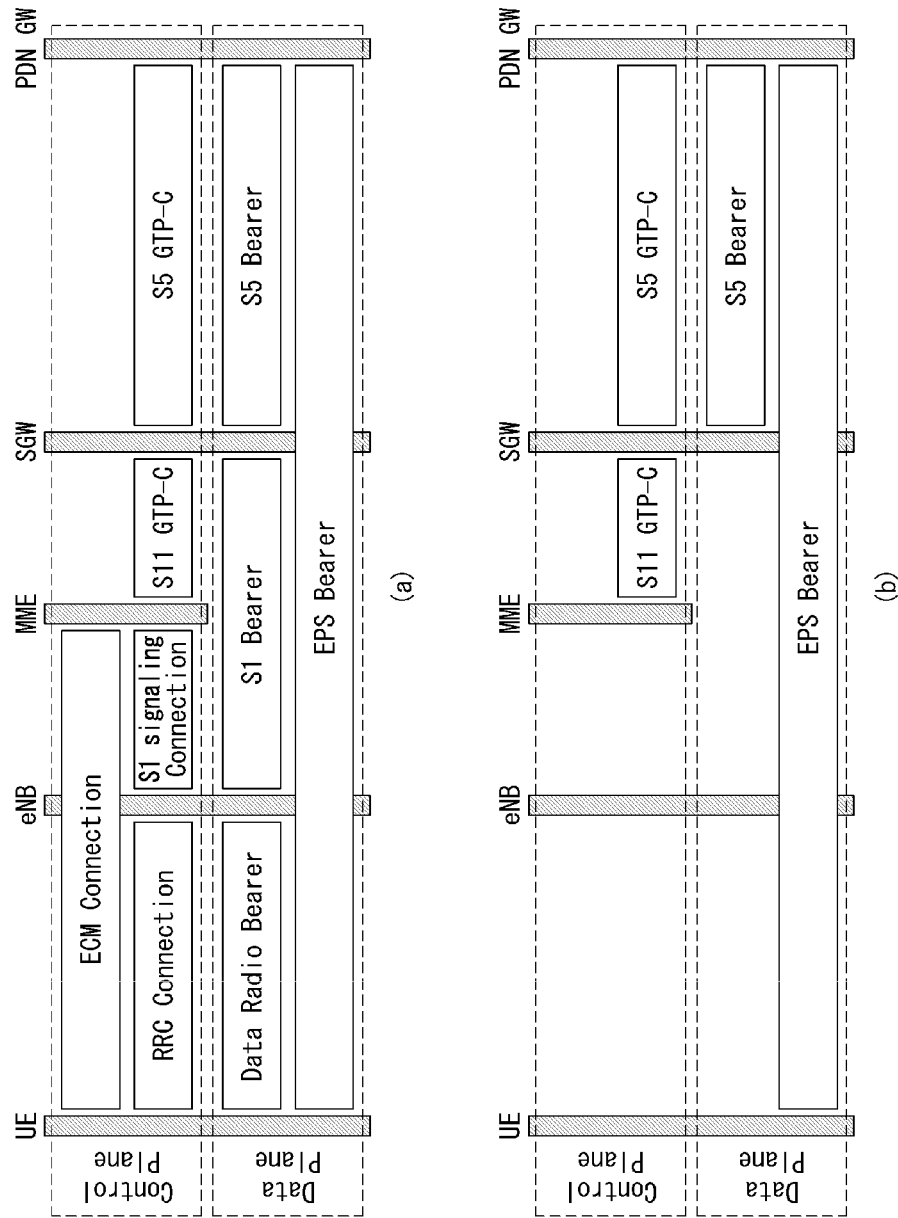

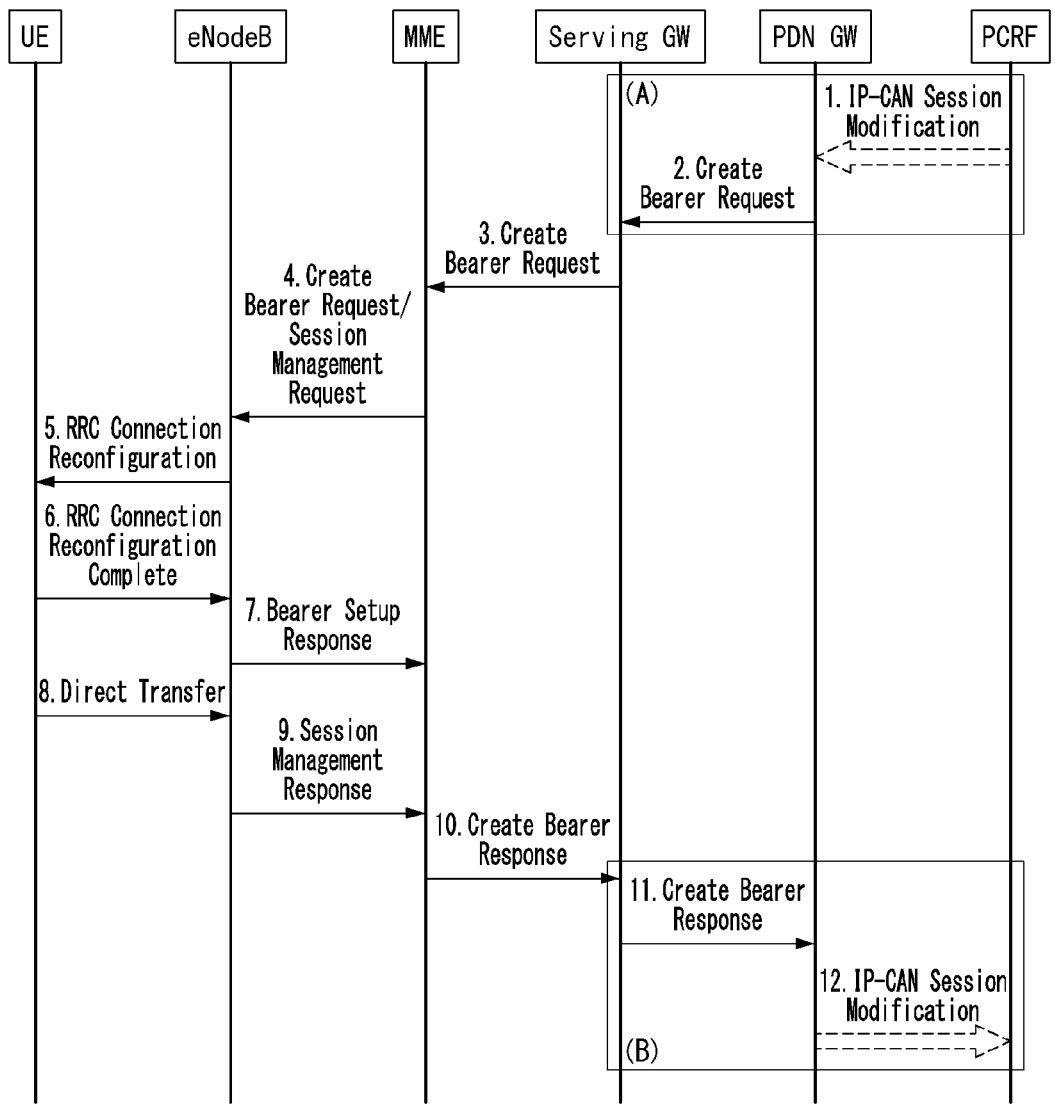

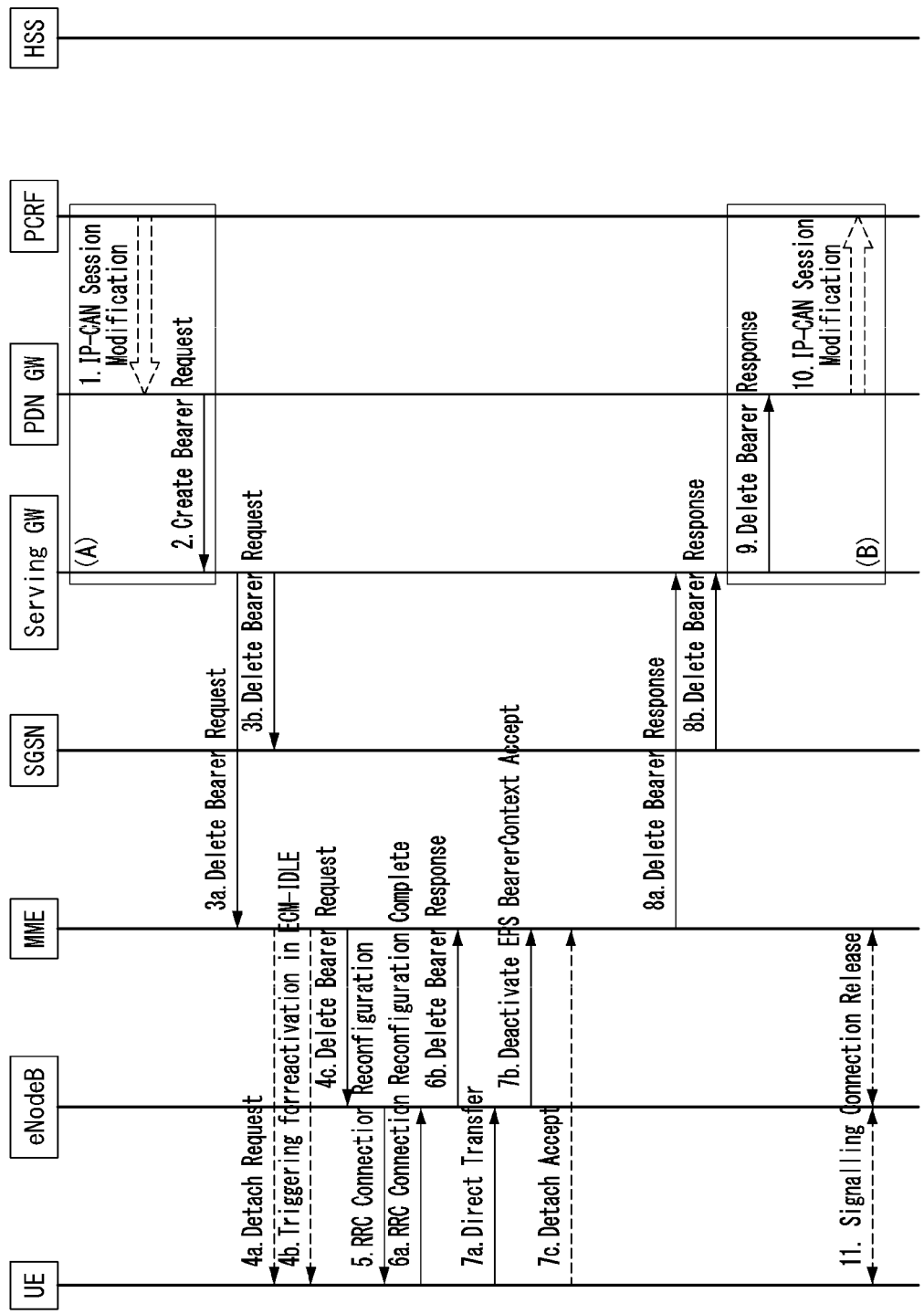
[Fig. 10]

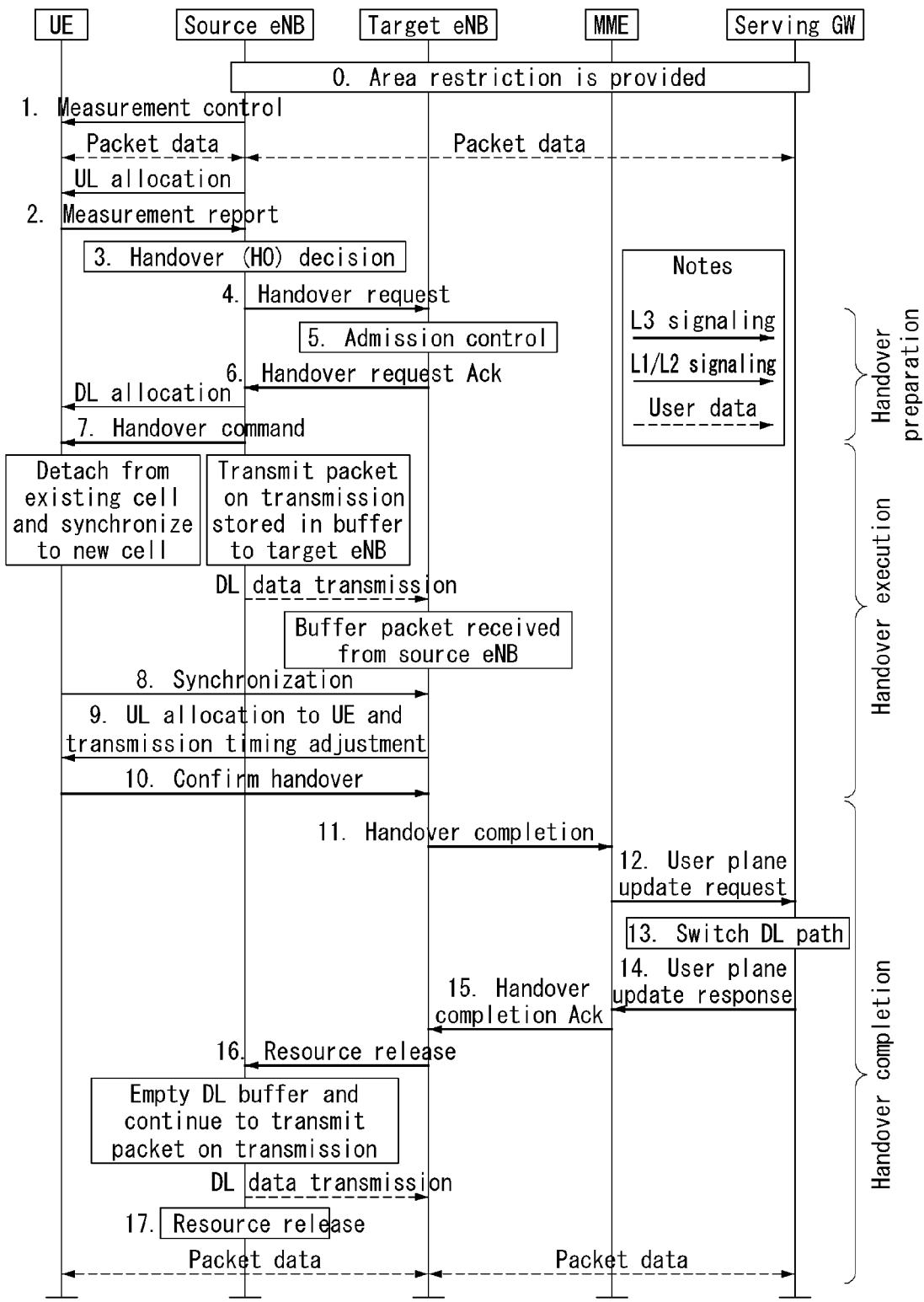
[Fig. 11]

[Fig. 12]
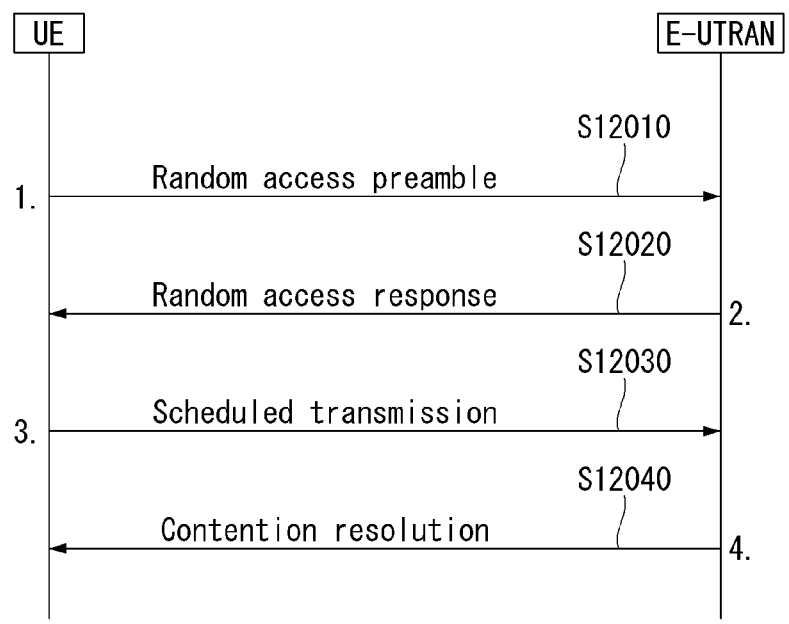

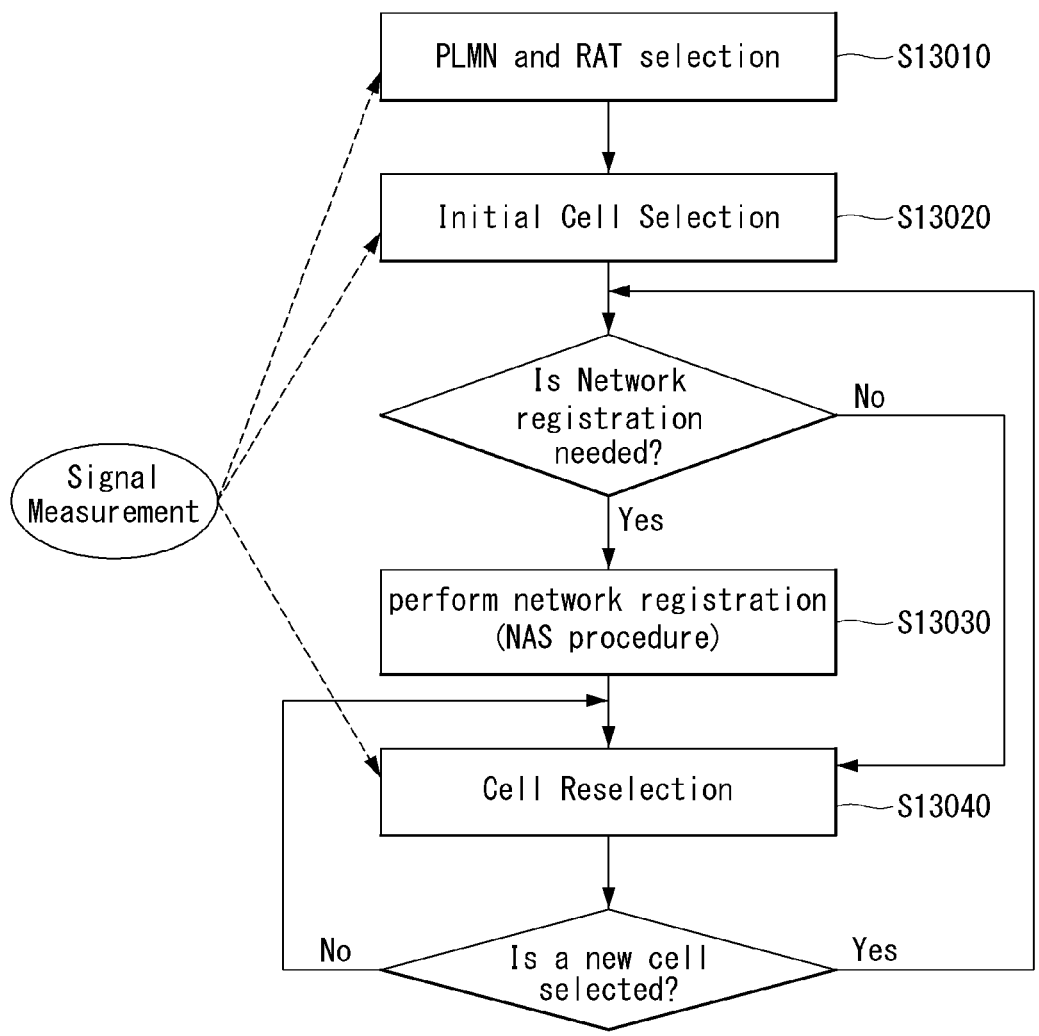
[Fig. 13]

[Fig. 14]
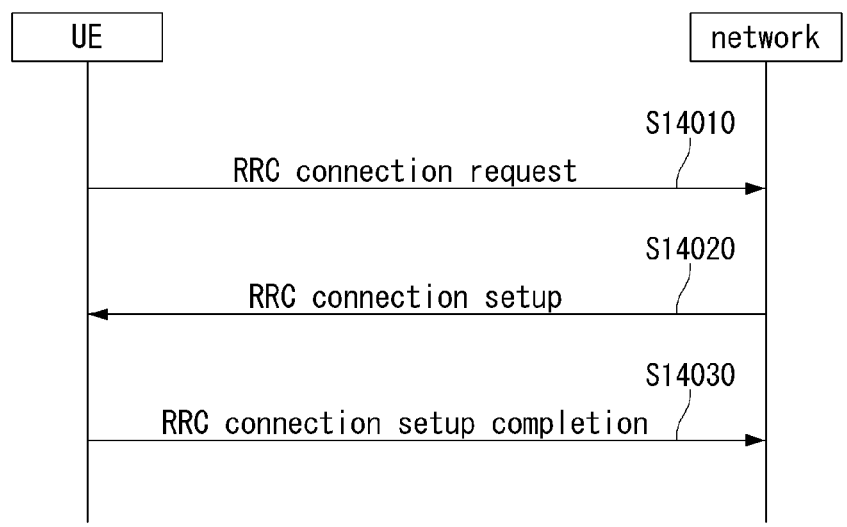

[Fig. 15]
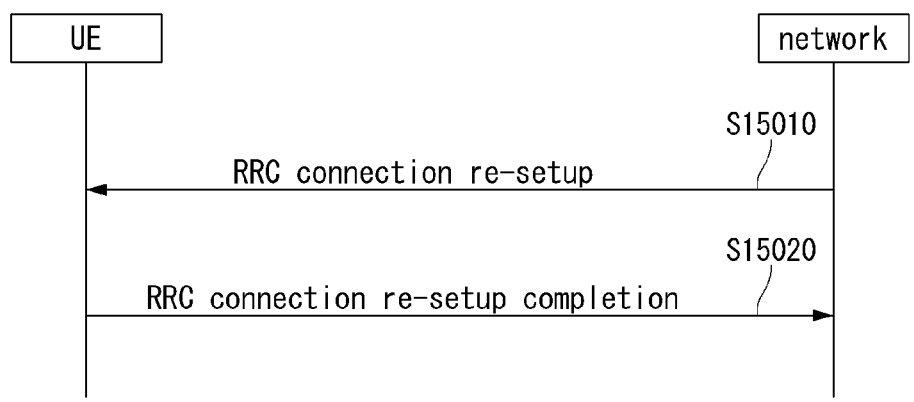

[Fig. 16]
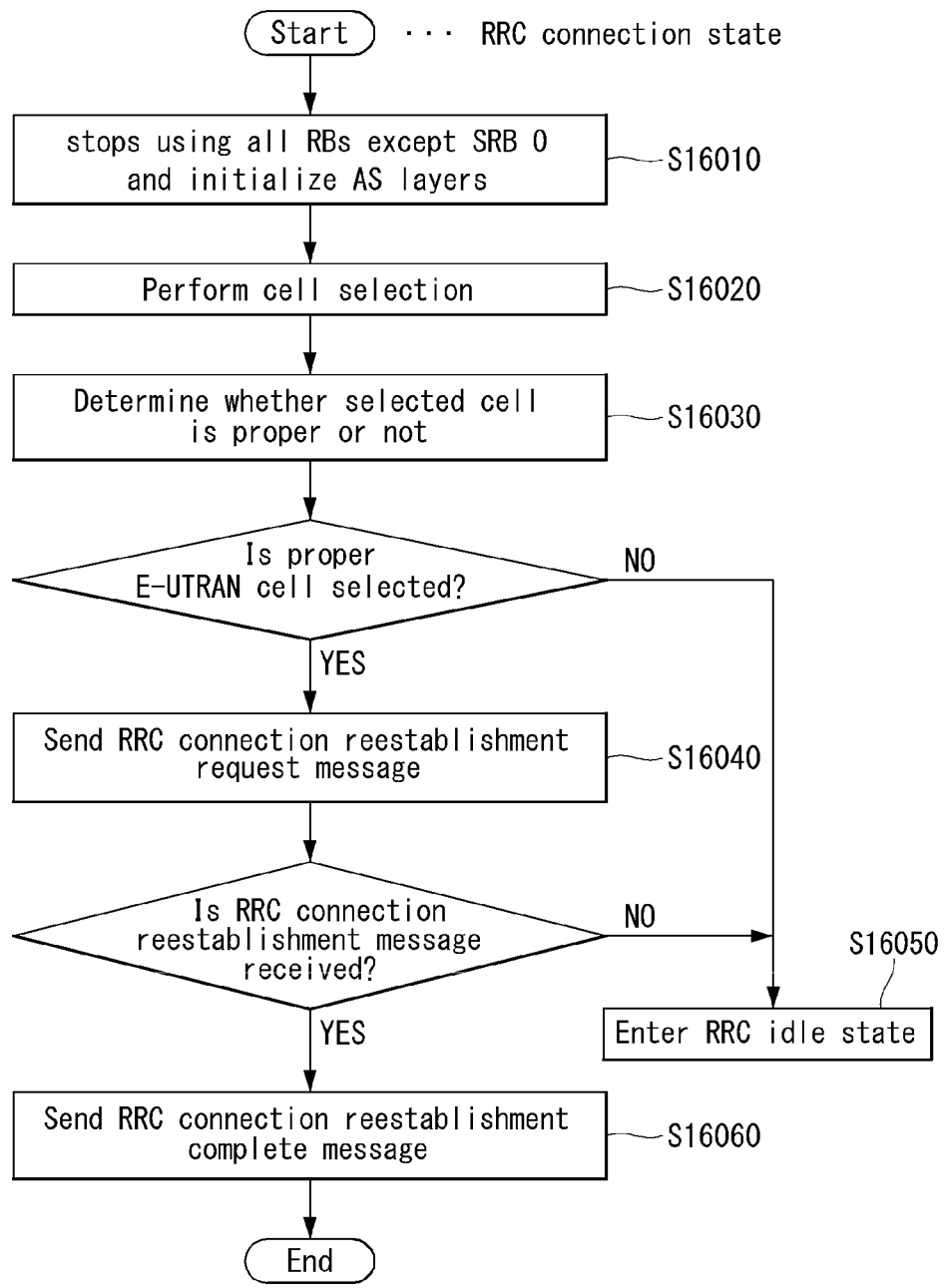

[Fig. 17]
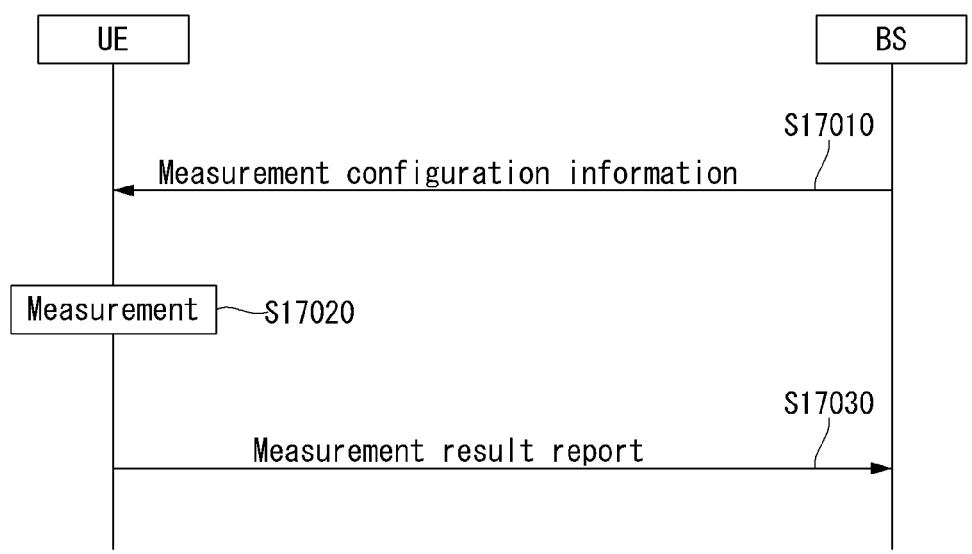

[Fig. 18]

[Fig. 19]
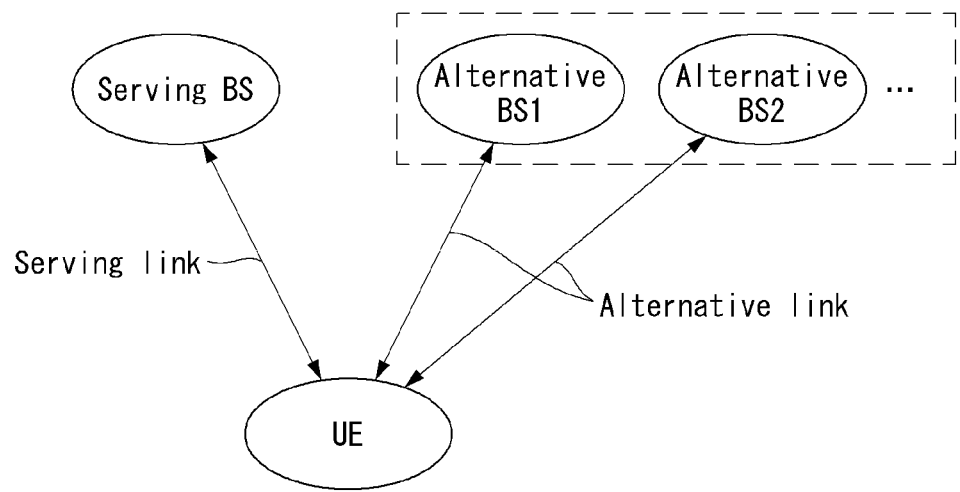

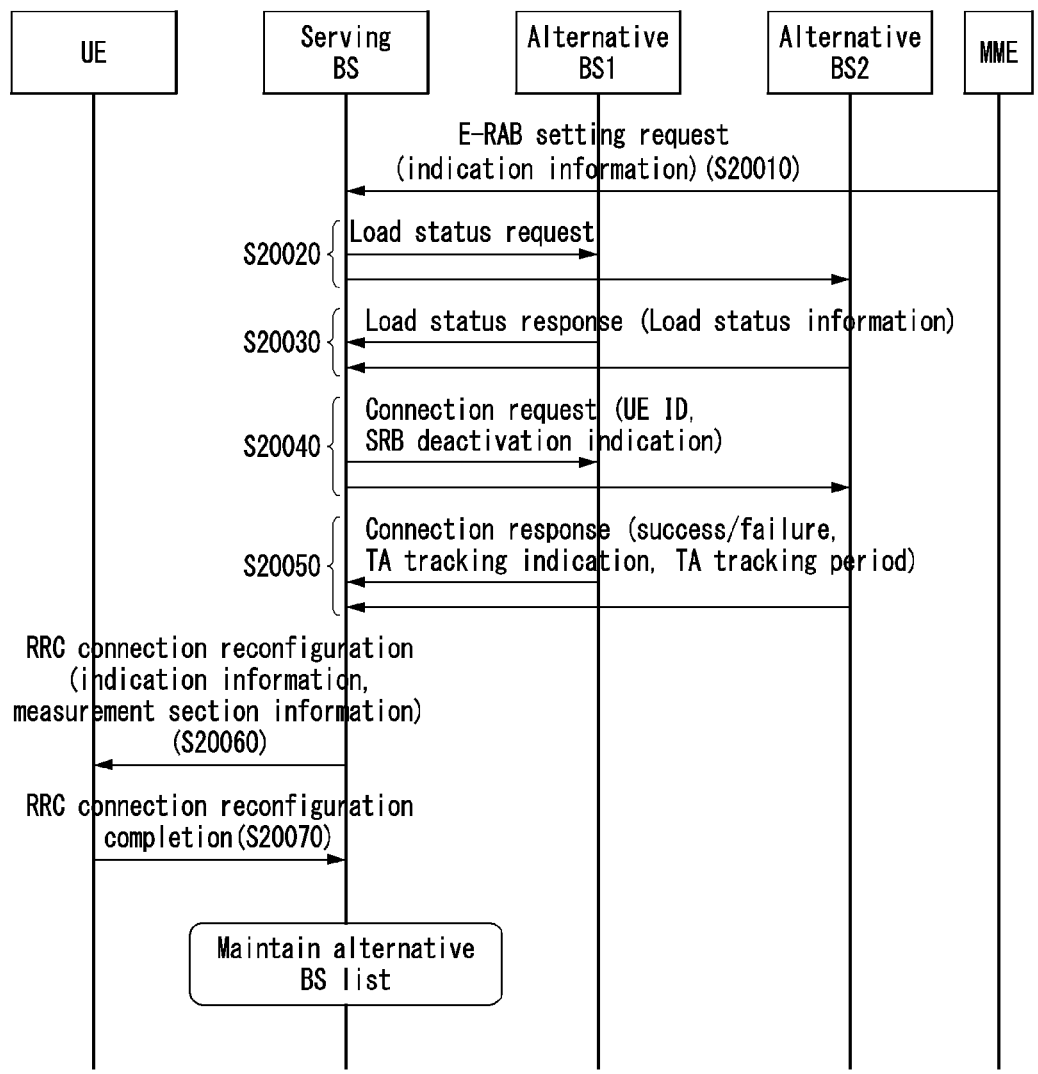
[Fig. 20]

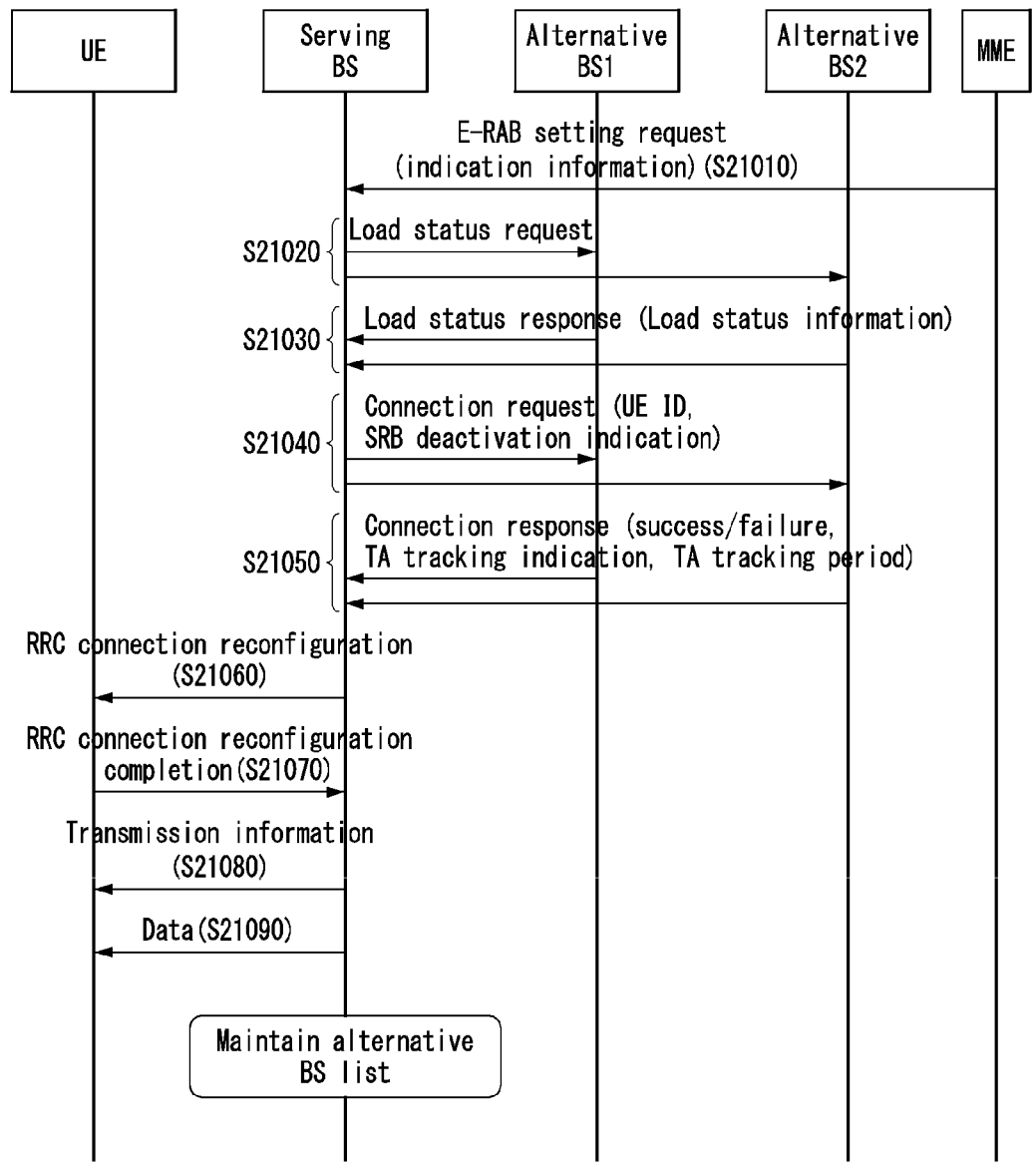
[Fig. 21]

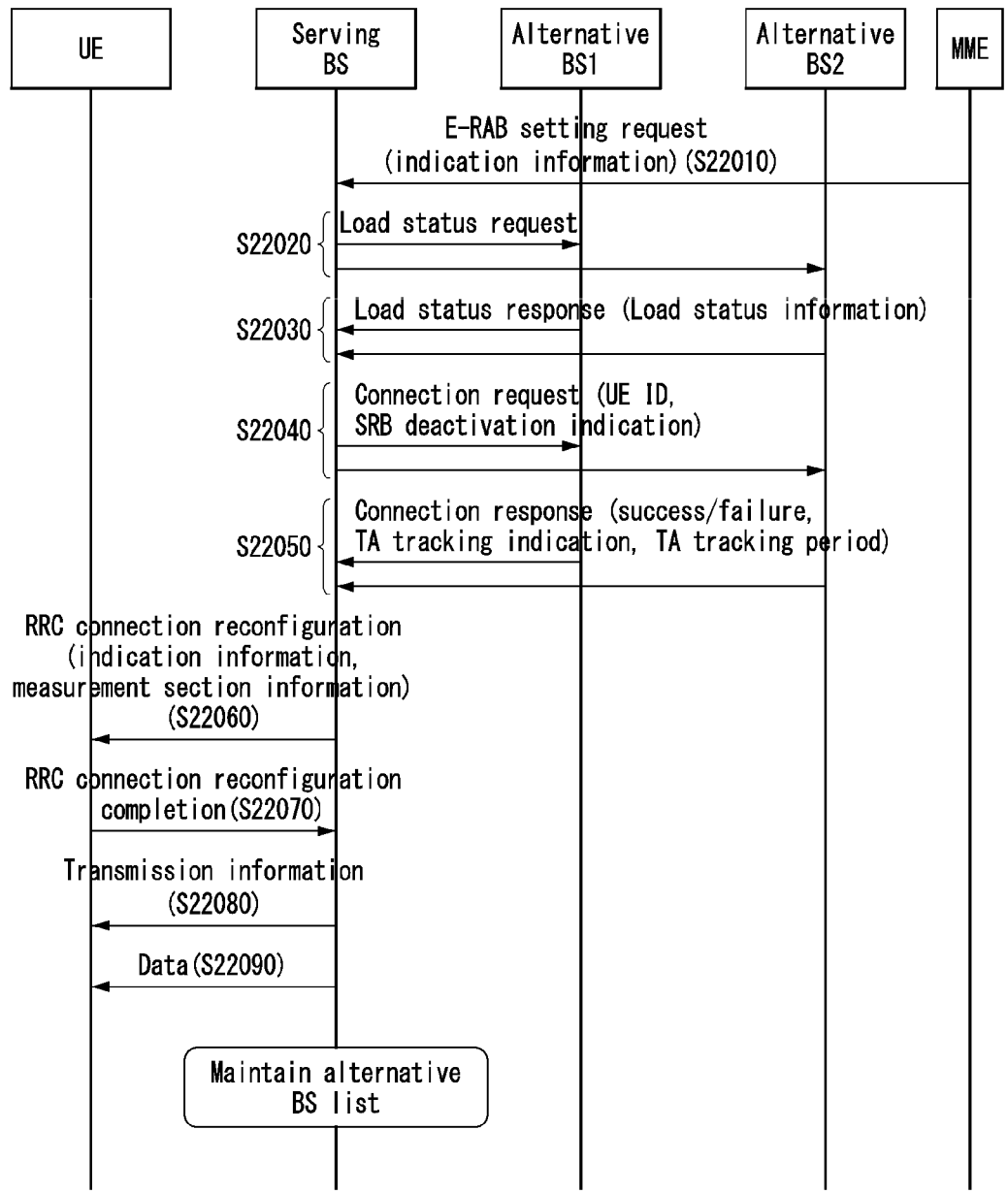
[Fig. 22]

[Fig. 23]
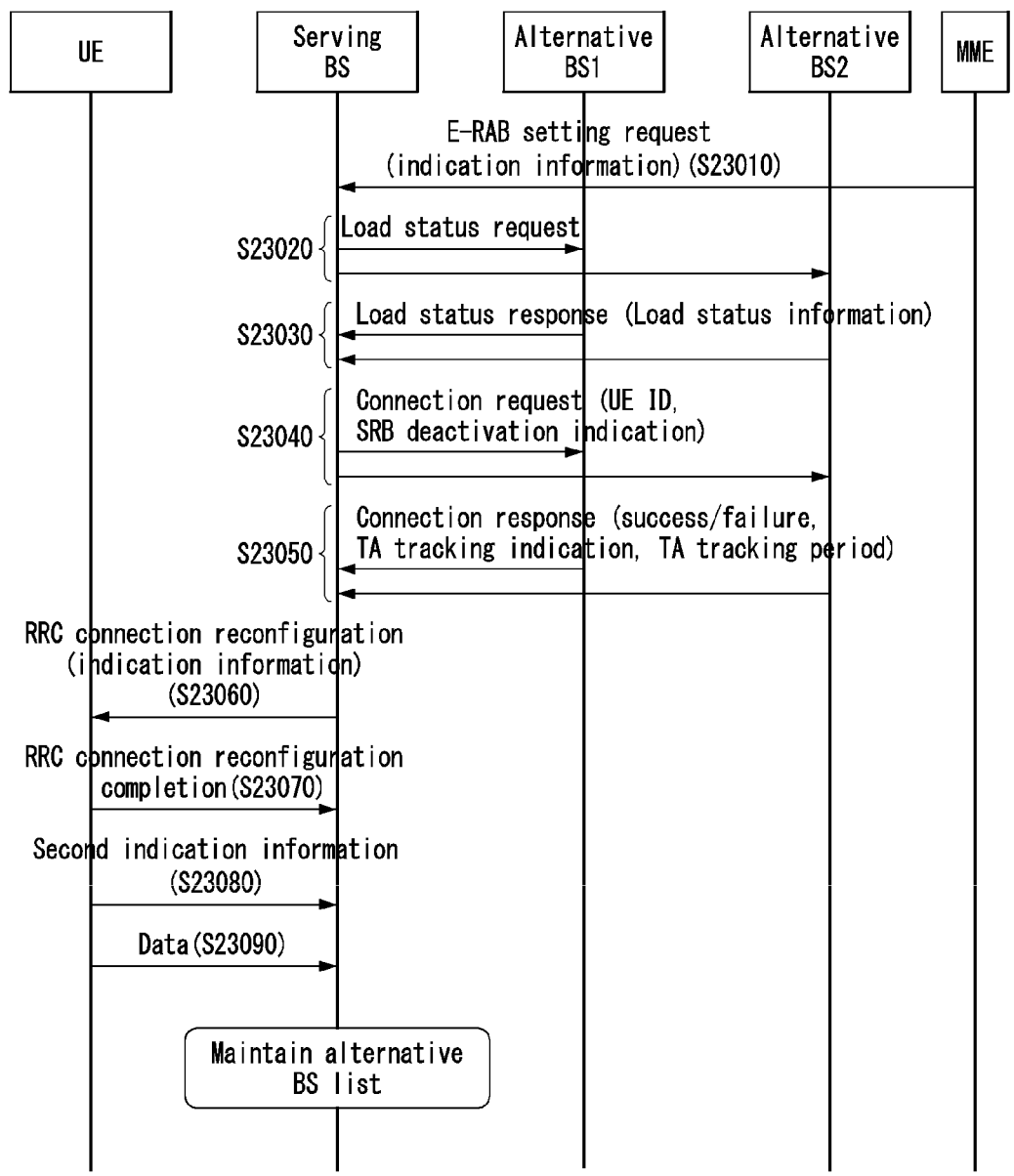

[Fig. 24]
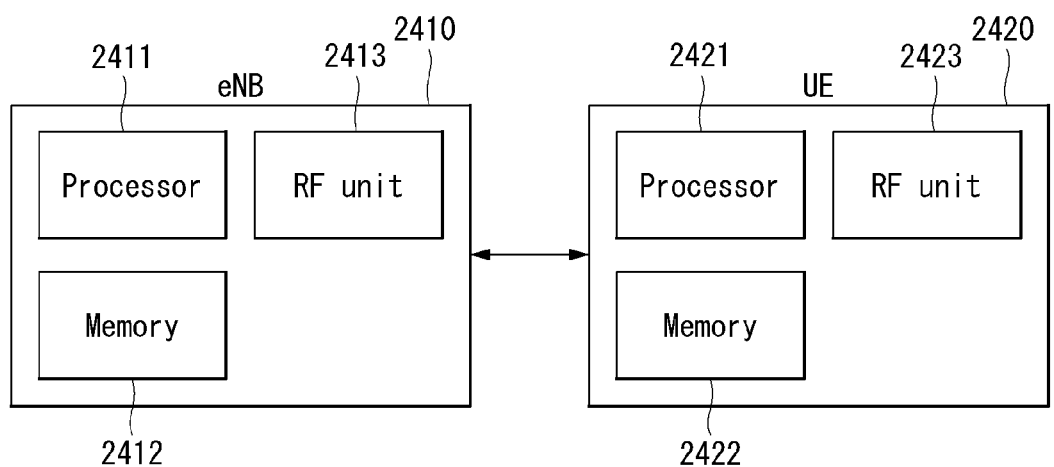

METHOD AND DEVICE FOR TRANSMITTING AND RECEIVING DATA IN WIRELESS COMMUNICATION SYSTEM

CROSS REFERENCE TO RELATED APPLICATIONS

This application is the National Phase of PCT International Application PCT/KR2015/014102, filed on Dec. 22, 2015, the contents of which are all hereby expressly incorporated by reference into the present application.

TECHNICAL FIELD

The present invention relates to a method for transmitting and receiving data in a wireless communication system, and more particularly, to a method of transmitting and receiving, by a user equipment (UE), data at a measurement gap and an apparatus supporting the same.

BACKGROUND ART

Mobile communication systems have been developed to provide voice services while guaranteeing user mobility. Such mobile communication systems have expanded their coverage from voice services through data services up to high-speed data services. However, as current mobile communication systems suffer resource shortages and users demand even higher-speed services, the development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as dual connectivity, massive Multiple Input Multiple Output (MIMO), in-band full duplex, non-orthogonal multiple access (NOMA), supporting super-wide band, and device networking, have been researched.

DISCLOSURE

Technical Problem

Currently, the radio link availability of LTE/LTE-A systems entirely depends on network coverage rate, which is as high as approximately 95%.

Moreover, it is assumed that, as for the radio link reliability of LTE/LTE-A systems, sufficient reliability can be provided by H-ARQ retransmission since BER (Block Error Rate) is 10-1 in the case of unicast data through PDSCH without separating a control plane (C-Plane) and a user plane (U-Plane).

Despite the fact that LTE/LTE-A systems have currently become highly active and provide various services, they do not provide connectivity that always ensures reliability for mission critical services (MCSs) in in every time slot.

Since LTE/LTE-A systems are designed to deliver relatively good connectivity most of the time, they provide a data rate near '0' in a specific poor coverage area where there is too much interference or network resources are overloaded.

In the future, it is expected that new MCSs will emerge that largely depend on the availability/reliability of radio links to satisfy a high level of communication quality, and the advancement of wireless technology for embracing such new MCSs is needed.

Accordingly, an aspect of the present specification is to provide a method for shifting away from 'Best Effort Mobile Broadband' of current LTE/LTE-A systems towards 'Truly Reliable Communication" of 5G.

That is, it is an object of the present invention to provide a method for avoiding a service interruption due to a measurement gap setting in providing multiple connections to UEs that are provided with MCSs in a future 5G mobile communication system.

That is, in the 5G mobile communication system, multiple connections are established with a plurality of alternative base stations per UE in order to provide a highly reliable service. However, if the same measurement gap is applied to the serving base station and the alternative base stations per UE, a section, in which the UE cannot receive uplink data or receive downlink data with respect to the serving base station and the alternative base stations, is generated in order to perform inter-frequency measurement, and thus if there is MSC data to be transmitted to or received from the base station in the section, or there is MCS data to be transmitted to or received from the UE by the base station, interruption inevitably occurs to a low delay or high reliability service, which is a problem.

Hence, a method for transmitting and receiving MSC data in a measurement gap section for seamless provision of high reliability service is proposed.

The methods proposed in the present invention are methods for realizing a flexible radio link connection control for improving the quality of the radio link quality of the UE for applications requiring a high reliability (Packet Error Rate $<10^{-6}$) while satisfying the low transmission delay requirement of less than 1 ms in providing the remote control service such as Smart Car Safety service, medical/industrial/robot.

A UE's searching for and maintaining an alternative base station, apart from radio links being used by it means providing support so that the UE can always possess radio links that meet minimum QoE requirements for MCSs within a specific geographical area.

Technical problems to be solved by the present invention are not limited to the above-mentioned technical problems, and other technical problems not mentioned herein may be clearly understood by those skilled in the art from description below.

Technical Solution

In an aspect, a method of transmitting and receiving data performed by a base station in a wireless communication system is provided. The method includes receiving a request message for requesting setting of an E-UTRAN radio access bearer (E-RAB) for data transmission and reception of a mission critical service (MCS) from a network node, wherein, when the MCS data is generated in the at least one first measurement gap, the request message includes indication information which allows transmission and reception of the data in at least one first measurement gap; and transmitting, to the user equipment (UE), at least one of the indication information or measurement gap information associated with the at least one first measurement gap in which the data is transmitted; and transmitting the data to the UE in the at least one first measurement gap.

Herein, the UE does not measure neighboring cells and frequencies for reception of the data in the at least one first measurement gap.

Herein, the measurement gap information includes at least one of system frame number (SFN) information on which the data is transmitted, information on a number of the at least one first measurement gap for transmitting the data, and pattern information indicating transmission time when the data is periodically transmitted.

Herein, the method further includes transmitting transmission information including transmission information related to transmission of the data to the UE, wherein the transmission information includes at least one of time information indicating a transmission start time of the data, duration information indicating a transmission duration of the data, or pattern information indicating transmission time when the data is periodically transmitted.

Herein, the method further includes transmitting, to at least one candidate base station, a setting request message requesting setting of an alternative link with the UE; and receiving a setting response message in response to the setting request message from the at least one candidate base station, wherein the request message includes first indication information indicating an alternative link setting between the UE and the at least one candidate base station.

Herein, the setting request message includes second indication information instructing to inactivate a signaling radio bearer (SRB) status of the alternative link.

Herein, at least one of the indication information or the measurement gap information is transmitted through a radio resource control (RRC) connection reconfiguration message.

In another aspect, a method of transmitting and receiving data performed by a base station in a wireless communication system is provided. The method includes receiving a request message requesting setting of an E-UTRAN radio access bearer (E-RAB) for data transmission/reception of a mission critical service (MCS) from a network node, wherein, when the MCS data is generated in the at least one first measurement gap, the request message includes indication information which allows transmission and reception of the data in the at least one first measurement gap; transmitting the first indication information to the user equipment (UE); receiving, from the UE, second indication information indicating generation of uplink data of the MCS to be transmitted in the at least one first measurement gap; and receiving the uplink data from the UE in the at least one measurement gap.

Herein, The UE does not measure neighboring cells and frequencies for transmission of the uplink data in the at least one first measurement gap.

Herein, the method further includes receiving transmission information for transmission of the uplink data from the UE, wherein the transmission information includes at least one of time information indicating a transmission start time point of the uplink data, information on a number of the at least one first measurement gap for transmitting the uplink data, and duration information indicating a transmission duration of the uplink data.

In further another aspect, a base station for transmitting and receiving data in a wireless communication system is provided. The base station includes: a communication unit configured to transmit and receive a radio signal with an external side; and a processor configured to be coupled to the communication unit functionally, wherein the processor is further configured to: receive a request message requesting setting of E-UTRAN radio access bearer (E-RAB) for data transmission and reception of a mission critical service (MCS) from a network node, wherein, when the MCS data is generated in at least one first measurement gap, the request message includes indication information allowing transmission and reception of the data in the measurement gap; transmit, to the user equipment (UE), at least one of indication information or measurement gap information associated with the at least one first measurement gap in which the data is transmitted; and transmit the data to the UE in the at least one first measurement gap.

Advantageous Effects

According to the method of transmitting and receiving data by a UE of the present invention, in the case that data for providing an MCS is generated, the generated data can be transmitted and received.

Also, in the present specification, if downlink data is generated in a measurement gap, downlink data can be received without interruption of service.

Also, in the present specification, when downlink data is generated in a measurement gap, the UE can receive downlink data without performing measurement in a measurement gap.

Also, in the present specification, if downlink data is generated in a measurement gap, downlink data can be transmitted/received at a measurement gap by transmitting indication information that allows data transmission/reception.

Also, in the present specification, if uplink data occurs in a measurement gap, uplink data can be transmitted and received.

Also, in the present specification, when uplink data is generated in a measurement gap, it is possible to inform the base station that uplink data has been generated and transmit/receive data.

Also, in the present specification, uplink data can be transmitted and received at a measurement gap by transmitting indication information that allows transmission and reception of data when data is generated in a measurement gap.

The effects obtainable in the present specification are not limited to the effects mentioned above, and other effects not mentioned can be clearly understood by those skilled in the art from the following description will be.

DESCRIPTION OF DRAWINGS

FIG. 1 is a view illustrating an Evolved Packet System which is associated with the Long Term Evolution (LTE) system to which the present invention may apply.

FIG. 2 illustrates a wireless communication system to which the present invention applies.

FIG. 3 illustrates a functional split of an E-UTRAN and an EPC to which the present invention may apply.

FIG. 4 is a diagram illustrating a radio protocol architecture to which technical features of the present specifications are applicable.

FIG. 5 is a diagram illustrating a structure of an S1 interface protocol in a wireless communication system to which the present invention may apply.

FIG. 6 is a diagram illustrating EMM and ECM states in a wireless communication system to which the present invention may apply.

FIG. 7 is a diagram illustrating a bearer structure in a wireless communication system to which the present invention may apply.

FIG. 8 is a diagram illustrating transmission paths of a control plane and a user plane in an EMM registration state in a wireless communication system to which the present invention may apply.

FIG. 9 is a diagram showing an example of a dedicated bearer activation procedure.

FIG. 10 is a diagram showing an example of a dedicated bearer deactivation procedure.

FIG. 11 illustrates a handover procedure defined in LTE (-A).

FIG. 12 is a diagram for explaining an operation procedure of a UE and a base station in a contention-based random access procedure.

FIG. 13 is a flowchart showing an operation of a UE in an RRC idle state to which the present invention may apply.

FIG. 14 is a flowchart showing an RRC connection establishment procedure to which the present invention may apply.

FIG. 15 is a flowchart showing an RRC connection reconfiguration procedure to which the present invention may apply.

FIG. 16 is a view showing an example of an RRC connection re-establishment procedure to which the present invention may apply.

FIGS. 17 and 18 are diagrams showing an example of a measurement execution method and a setting of a measurement gap to which the present invention may apply.

FIG. 19 is a conceptual diagram of a multi-link to which the methods proposed in the present specification can be applied.

FIG. 20 is a flowchart illustrating an example of a method for transmitting downlink data in a measurement gap proposed in the present specification.

FIG. 21 is a flowchart illustrating another example of a method for transmitting downlink data in a measurement gap proposed in the present specification.

FIG. 22 is a flowchart illustrating another example of a method for transmitting downlink data in a measurement gap proposed in the present specification.

FIG. 23 is a flowchart illustrating another example of a method for transmitting downlink data in a measurement gap proposed in the present specification.

FIG. 24 is a block diagram illustrating a wireless device by which the methods proposed in the specification may be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a UE node of a network, which directly communicates with the UE. In some cases, a specific operation described as performed by the eNB may be performed by an upper node of the eNB. Namely, it is apparent that, in a network comprised of a plurality of network nodes including an eNB, various operations performed for communication with a UE may be performed by the eNB, or network nodes other than the eNB. The term 'eNB' may be replaced with the term 'fixed station', 'base station (BS)', 'Node B', 'base transceiver system (BTS),', 'access point (AP)', etc.

The term 'user equipment (UE)' may be replaced with the term 'UE', 'mobile station (MS)', 'user UE (UT)', 'mobile subscriber station (MSS)', 'subscriber station (SS)', 'Advanced Mobile Station (AMS)', 'Wireless UE (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

Prior to going further to the description taken in conjunction with the drawings, the terms used herein are briefly defined for ease of understanding.

EPS: abbreviation of Evolved Packet System. Means a core network supporting a long term evolution (LTE) network. An evolved network of UMTS.

PDN (public data network): independent network where a servicing server is positioned.

APN (access point name): Name of an access point managed by a network, which is provided to UE. That is, the name of PDN (character string). Based on the name of the access point, a PDN for transmission/reception of data is determined.

TEID (tunnel endpoint identifier): End point ID of a tunnel configured between nodes in a network, configured per period on a per UE bearer basis.

MME: abbreviation of Mobility Management Entity. Functions to control each entity in the EPS to provide mobility and session for the UE.

Session: path for data transmission, and its unit may be PDN, bearer, or IP flow.

The differences between the units may be divided into an overall target network unit (APN or PDN unit), a unit separated with QoS therein (bearer unit), and a destination IP address unit as defined in 3GPP.

PDN connection: refers to connection from a UE to PDN, i.e., correlation (connection) between a UE represented in an IP address and PDN represented in APN. This means connection (UE-PDN GW) between entities in the core network so that the session may be formed.

UE context: circumstance information of UE used to manage the UE in the network. That is, circumstance information consisting of UE id, mobility (e.g., current position), or attribute of session (QoS, priority, etc.).

FIG. 1 is a view illustrating an Evolved Packet System which is associated with the Long Term Evolution (LTE) system to which the present invention may apply.

The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE.

When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA).

Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention applies.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10.

The base stations 20 are interconnected by means of an X2 interface. The base stations 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the base station.

FIG. 3 illustrates a functional split of an E-UTRAN and an EPC to which the present invention may apply.

Referring to the FIG. 3, shaded blocks represent radio protocol layers, and empty blocks represent functional entities of the control plane.

The base station performs the following functions: (1) radio resource management (RRM) function such as radio bearer (RB) control, radio admission control, connection mobility control, dynamic resource allocation to the UE; (2) IP (Internet Protocol) header compression and decryption of user data stream; (3) routing of user plane data to a serving gateway (S-GW); (4) scheduling and transmission of a paging message; (5) scheduling and transmission of broadcast information; and (6) measurement for mobility and scheduling and establishing a measurement report.

An MME performs the following functions: (1) distribution of paging messages to base stations; (2) security control; (3) idle state mobility control; (4) S bearer control; (5) ciphering and integrity protection of NAS (Non-Access Stratum) signaling.

The S-GW performs the following functions: (1) termination of a user plane packet with respect to paging; and (2) user plane switching to support UE mobility.

FIG. 4 is a diagram illustrating a radio protocol architecture to which technical features of the present specifications are applicable.

FIG. 4A shows an example of a radio protocol architecture for a user plane, and FIG. 4B shows an example of a radio protocol structure for a control plane.

The user plane is a protocol stack for transmitting user data, and the control plane is a protocol stack for transmitting control signals.

Referring to FIGS. 4(a) and 4(b), a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Table 1 below shows an example of RNTI values used in the present invention.

TABLE 1

| Value (hexa-decimal) | RNTI |
|---|---|
| 0000 | N/A |
| 0001-003C | RA-RNTI, C-RNTI, Semi-Persistent Scheduling C-RNTI, Temporary C-RNTI, eIMTA-RNTI, TPC-PUCCH-RNTI, TPC-PUSCH-RNTI and SL-RNTI |
| 003D-FFF3 | C-RNTI, Semi-Persistent Scheduling C-RNTI, eIMTA-RNTI, Temporary C-RNTI, TPC-PUCCH-RNTI, TPC-PUSCH-RNTI and SL-RNTI |
| FFF4-FFFc | Reserved for future use |
| FFFD | M-RNTI |
| FFFE | P-RNTI |
| FFFF | SI-RNTI |

FIG. 5 illustrates an S1 interface protocol structure in a wireless communication system to which the present invention may apply.

(a) of FIG. 5 illustrates the control plane protocol stack in the S1 interface, and (b) of FIG. 5 illustrates the user plane interface protocol structure in the S1 interface.

With reference to FIG. 5, the S1 control plane interface (S1-MME) is defined between the eNB and the MME. The transport network layer is built on IP transport, similarly to the user plane, but for the reliable transport of signaling messages SCTP is added on top of IP. The application layer signaling protocol is referred to as S1-AP (S1 Application Protocol).

The SCTP layer provides guaranteed delivery of application layer messages.

The transport IP layer employs point-to-point transmission for Protocol Data Unit (PDU) signaling transmission.

For each S1-MME interface instance, a single SCTP association uses a pair of stream identifiers for the S1-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying UE-specific S1-MME signaling transmission bearer. The communication context identifier is delivered within each S1-AP message.

If the S1 signaling transport layer notifies the S1AP layer of disconnection of signaling, the MME changes the state of the UE which has used the corresponding signaling connection to ECM-IDLE state. Furthermore, the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

EMM and ECM States

EPS Mobility Management (EMM) and EPS Connection Management (ECM) states will be described.

FIG. 6 illustrates an EMM and ECM states in a wireless communication system to which the present invention may apply.

With reference to FIG. 6, to manage mobility of the UE in the NAS layer defined in the control planes of the UE and the MME, EMM-REGISTERED and EMM-DEREGISTERED states may be defined depending on whether the UE is attached to or detached from a network. The EMM-REGISTERED and the EMM-DEREGISTERED states may be applied to the UE and the MME.

Initially, the UE stays in the EMM-DEREGISTERED state when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

Likewise, to manage signaling connection between the UE and the network, ECM-CONNECTED and ECM-IDLE states may be defined. The ECM-CONNECTED and ECM-IDLE states may also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, if RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network may identify the UE staying in the ECM-CONNECTED state at the level of cell unit and may control the UE in an effective manner.

Meanwhile, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE may receive a broadcast of system information and paging information by monitoring a paging signal at a specific paging occasion for each piece of UE-specific paging DRX cycle.

When the UE is in the ECM-IDLE state, the network does not carry context information of the UE. Therefore, the UE staying in the ECM-IDLE state may perform a mobility-related procedure based on the UE, such as cell selection or cell reselection, without necessarily following an order of the network. If the position of the UE differs from the position recognized by the network while the UE is in the ECM-IDLE state, the UE may inform the network of the corresponding position of the UE through a Tracking Area Update (TAU) procedure.

Meanwhile, when the UE is in the ECM-CONNECTED state, mobility of the UE is managed by an order of the network. While the UE stays in the ECM-CONNECTED state, the network knows to which cell the UE currently belongs. Therefore, the network may transmit and/or receiver data to or from the UE, control mobility of the UE, such as handover, and perform cell measurement with respect to neighboring cells.

As described above, the UE has to make a transition to the ECM-CONNECTED state in order to receive a general mobile communication service, such as a voice or data communication service. When the UE is first powered on, the UE in its initial state stays in the ECM-IDLE state as in the EMM state, and if the UE successfully registers to the corresponding network through an initial attach procedure, the UE and the MME make a transition to the ECM connection state. Furthermore, if UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

FIG. 7 illustrates a bearer structure in a wireless communication system to which the present invention may apply.

When a UE is connected to a Packet Data Network (PDN) (which is the peer entity of FIG. 7), a PDN connection is established, which may also be called an EPS session. The PDN provides a service function such as the Internet or IP Multimedia Subsystem (IMS) through an external or internal IP network of a service provider.

An EPS session comprises one or more EPS bearers. The EPS bearer refers to the transmission path of traffic generated between the UE and the PDN GW for the EPS to deliver user traffic. One or more EPS bearers may be set up for each UE.

Each EPS bearer may be classified into E-UTRAN Radio Access Bearer (E-RAB) or S5/S8 bearer, and the E-RAB may be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. When an E-RAB is existed, the E-RAB bearer is one-to-one mapped to the EPS bearer. A Data Radio Bearer (DRB) delivers packets of the EPS bearer between the UE and the eNB. When a DRB is existed, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is an IP flow or a group of IP flows obtained by classifying (or filtering) user traffic according to an individual service. A plurality of SDFs may be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs may be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer may be one of two types: a default bearer and a dedicated bearer. The UE may have one default bearer and one or more dedicated bearers for each PDN. The minimum basic bearer that the EPS session may have with respect to one PDN is called the default bearer.

The EPS bearer may be classified on the basis of its identity. The EPS bearer identity is allocated by the UE or the MME. The dedicated bearer(s) is combined with the default bearer by a Linked EPS Bearer Identity (LBI).

When the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (namely, DRB and S1 bearer) is released. And when new traffic is generated in the corresponding PDN, the E-RAB bearer is reconfigured to deliver traffic.

When the UE attempts to use a service of which the Quality of Service (QoS) (e.g., Video on Demand (VoD) service, etc.) may not be supported by the default bearer while using a service (e.g., the Internet) through the default bearer, a dedicated bearer is created when the UE demands the high QoS service. In the case there is no traffic from the UE, the dedicated bearer is released. The UE or the network may create a plurality of dedicated bearers depending on needs.

Depending on which service the UE uses, the IP flow may have different QoS characteristics. When the EPS session for the UE is established or modified, the network allocates network resources; or determines a control policy about QoS and applies the policy while the EPS session is maintained. The aforementioned operation is called the Policy and Charging Control (PCC). The PCC rule is determined based on the operator's policy (e.g., a QoS policy, gate status, charging method, etc.).

The PCC rule is determined in SDF unit. In other words, according to the service that the UE uses, the IP flow can have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

PCC rules can be classified by dynamic PCC rules and pre-defined PCC rules. A dynamic PCC rule is provided dynamically from the PCRF to the P-GW when the EPS session is established or modified. On the other hand, a pre-defined PCC rule is predefined in the P-GW and activated/deactivated by the PCRF.

The EPS bearer includes a QoS Class Identifier (QCI) and Allocation and Retention Priority (ARP) as basic QoS parameters.

A QCI is a scalar used as a reference for accessing node-specific parameters which control bearer level packet forwarding treatment, where the scalar value is pre-configured by a network operator. For example, the scalar can be pre-configured by one of integer values ranging from 1 to 9.

The main purpose of the ARP is to determine whether a request for an establishment or modification of a bearer can be accepted or needs to be rejected in case of resource limitations. Also, the ARP can be used by the eNB to determine which bearer(s) to drop during periods of exceptional limited resources (e.g., handover).

EPS bearers can be classified to Guaranteed Bit Rate (GBR)-type bearers and non-GBR type bearers depending on QCI resource type. A default bearer is always a non-GBR type bearer, but a dedicated bearer can be a GBR or non-GBR type bearer.

A GBR-type bearer has GBR and Maximum Bit Rate (MBR) as QoS parameters in addition to the QCI and the ARP. The MBR indicates that fixed resources are allocated (bandwidth is guaranteed) for each bearer. On the other hand, a non-GBR type bearer has an Aggregated MBR (AMBR) as a QoS parameter in addition to the QCI and the ARP. The AMBR indicates that instead of allocating resources to individual bearers, maximum bandwidth is allocated, where other non-GBR type bearers can be used together.

Once the QoS of the EPS bearer is determined, the QoS of each bearer is determined for each interface. Since the bearer of each interface provides QoS of the EPS bearer according to the interface, the EPS bearer, RB, and S1 bearer all have a one-to-one relationship among them.

When the UE, while using a service through the default bearer, uses a service that the default bearer alone is not enough to provide sufficient QoS, a dedicated bearer is generated on-demand.

FIG. 8 illustrates transmission paths of a control plane and a user plane in an EMM registration state in a wireless communication system to which the present invention may apply.

(a) of FIG. 8 illustrates ECM-CONNECTED state, and (b) of FIG. 8 illustrates ECM-IDLE state.

If the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in (a) of FIG. 8, in the ECM-CONNECTED state where user traffic is present, NAS signaling connection, namely, ECM connection (RRC connection and S1 signaling connection) is established. Also, S11 GTP-C (GPRS Tunneling Protocol Control Plane) connection is established between the MME and the SGW, and S5 GTP-C connection is established between the SGW and the PDN GW.

Also, in the ECM-CONNECTED state, the DRB, S1 bearer, and S5 bearer are all set up (that is, radio or network resources are allocated).

As shown in (b) of FIG. 8, in the ECM-IDLE state where there is no user traffic, the ECM connection (that is, RRC connection and S1 signaling connection) is released. However, the S11 GTP-C connection between the MME and the SGW and the S5 GTP-C connection between the SGW and the PDN GW are retained Also, in the ECM-IDLE state, the DRB and the S1 bearer are all released, but the S5 bearer is retained (that is, radio or network resources are allocated).

FIG. 9 is a diagram showing an example of a dedicated bearer activation procedure.

FIG. 9 is a flowchart illustrating a dedicated bearer activation procedure for S5/S8 based on GTP (GPRS Tunneling Protocol).

First, when dynamic PCC is arranged, the PCRF sends a PCC decision provision (QoS policy) message to the PDN GW.

Next, the PDN GW transmits a Create Bearer Request message (IMSI, PTI, EPS Bearer QoS, TFT, S5/S8 TEID, Charging Id, LBI, and Protocol Configuration Options) for requesting bearer generation to the Serving GW.

Then, the Serving GW transmits the Create Bearer Request (IMSI, PTI, EPS Bearer QoS, TFT, S1-TEID, GTP-based S5/S8, LBI and Protocol Configuration Options) message to the MME.

Next, the MME transmits Bearer Setup Request (EPS Bearer Identity, EPS Bearer QoS, Session Management Request, S1-TEID) message to the eNodeB for requesting bearer setup.

Next, the eNodeB transmits an RRC Connection Reconfiguration (Radio Bearer QoS, Session Management Request, EPS RB Identity) message to the UE.

Next, the UE transmits an RRC Connection Reconfiguration Complete message to the eNodeB to inform the radio bearer activation.

Next, the eNodeB transmits Bearer Setup Response (EPS Bearer Identity, S1-TEID) message to the MME to inform the UE of radio bearer activation.

Next, the UE transmits a Direct Transfer (Session Management Response) message to the eNodeB.

Next, the eNodeB transmits an Uplink NAS Transport (Session Management Response) message to the MME.

Next, the MME transmits a Create Bearer Response (EPS Bearer Identity, S1-TEID, User Location Information (ECGI)) message to the Serving GW in order to inform bearer activation to the Seving GW.

Next, the Serving GW transmits a Create Bearer Response (S5 Bearer Identity, S5/S8-TEID, and User Location Information (ECGI)) message to the PDN GW to inform bearer activation to the PDN GW.

If a dedicated bearer activation procedure is triggered by the PCC Decision Provision message from the PCRF, the PDN GW indicates to the PCRF whether the requested PCC decision (QoS policy) has been performed.

FIG. 10 is a diagram illustrating an example of a dedicated bearer deactivation procedure.

FIG. 10 is a flowchart illustrating a dedicated bearer deactivation procedure for S5/S8 based on GTP (GPRS Tunneling Protocol).

The procedure of FIG. 10 may be used to deactivate a dedicated bearer or deactivate all bearers belonging to a PDN address.

If the default bearer belonging to the PDN connection is deactivated, the PDN GW deactivates all bearers belonging to the PDN connection. A specific procedure will be described with reference to FIG. 10.

FIG. 11 illustrates a handover procedure defined in LTE.

FIG. 11 shows a case where the MME and the serving gateway are not changed.

The detailed handover procedure is as follows and the 3GPP TS (Technical Specification) 36.300 may be referred to.

Step 0: The UE context in the source base station (eNB) includes information about the roaming restriction given at connection establishment or recent TA update.

Step 1: The source base station sets up the UE measurement procedure according to the area restriction information. The measurements provided by the source base station may help control the connection mobility of the UE.

Step 2: The UE is triggered to send a measurement report according to the rules set by (system information, etc.).

Step 3: The source base station determines whether to hand over the UE based on measurement report and Radio Resource Management (RRM) information.

Step 4: The source BS transmits information required for the handover (HO) to the target BS through the handover request message. The information required for handover includes a UE X2 signaling context reference, a UE S1 EPC signaling context reference, a target cell ID, an RRC context including an identifier (e.g., a cell radio network temporary identifier (CRNTI) in the source BS.

Step 6: The target base station prepares L1/L2 and HO and transmits a handover request ACKNOWLEDGE message to the source base station. The handover request Ack message includes a transparent container (RRC message) transmitted to the UE for handover. The container includes a new C-RNTI, a security algorithm identifier of the target base station. Further, the container may further include additional parameters such as connection parameters, SIB, and the like.

Also, the target base station divides the RA signatures into a non-contention based RA signature set (hereinafter referred to as group 1) and a competition based RA signature set (hereinafter referred to as group 2) in order to minimize the handover delay, then selects one of the group 1 to inform the handover UE.

That is, the container may further include information regarding the dedicated RA signature. The container may also include information about a RACH slot duration for which a dedicated RA signature is to be used.

Step 7: The source base station generates an RRC message (e.g., RRCConnectionReconfiguration message) having mobility control information for the UE for handover, and transmits the generated RRC message to the UE.

The RRCConnectionReconfiguration message includes a parameter necessary for handover (e.g., a new C-RNTI, a security algorithm identifier of the target base station, and optionally, information on a dedicated RACH signature, target base station SIB, etc.) and commands performance of HO.

Step 8: The source BS transmits a serial number (SN) STATUS TRANSFER message to the target BS to convey the uplink PDCP SN reception status and the downlink PDCP SN transmission status.

Step 9: After receiving the RRCConnectionReconfiguration message, the UE attempts to access the target cell using the RACH process. If the dedicated RACH preamble is allocated, the RACH proceeds on a non-competition basis, and otherwise, on a contention-based basis.

Step 10: The network performs uplink allocation and timing adjustment.

Step 11: When the UE has successfully connected to the target cell, the UE transmits an RRCConnectionReconfigurationComplete message (CRNTI) to confirm handover and informs the target BS of the completion of the handover process by transmitting an uplink buffer status report. The target BS checks the C-RNTI received through the Handover Confirm message and starts data transmission to the UE.

Step 12: The target base station sends a Path Switch message to the MME to inform the UE that it has changed the cell.

Step 13: The MME sends a User Plane Update Request message to the serving gateway.

Step 14: The serving gateway switches the downlink data path to the target side. The serving gateway sends an end marker packet to the source base station over the existing path, and then releases the user plane/TNL resource for the source base station.

Step 15: The serving gateway sends a User Plane Update Response message to the MME.

Step 16: The MME responds to the path switch message using the path switch Ack message.

Step 17: The target base station transmits a UE Context Release message to inform the source base station that the HO is successful and triggers the resource release.

Step 18: Upon receiving the UE context release message, the source base station releases the user plane related resources associated with the radio resource and the UE context.

FIG. 12 is a diagram for explaining an operation procedure of a UE and a base station in a contention-based random access procedure.

(1) Transmission of First Message

A UE may randomly select a random access preamble from a set of random access preambles indicated through system information or a Handover Command, select a Physical RACH (PRACH) resource capable of carrying the random access preamble, and transmit the random access preamble in the PRACH resource (S12010).

(2) Reception of Second Message

The method of receiving the random access response information is similar to the above-described non-contention based random access procedure. That is, after the UE transmits the random access preamble as in step S1201, the base station attempts to receive its random access response in the random access response reception window indicated by the system information or the handover command, and receives the PDSCH through the RA-RNTI information (S12020). In this way, UL Grant, a temporary cell identifier (Temporary C-RNTI), and a time synchronization correction value (TAC), etc. may be received.

(3) Transmission of Third Message

Upon receipt of a valid random access response, the UE processes information included in the random access response. That is, the UE applies the TAC and stores the temporary C-RNTI. In addition, the UE transmits data (i.e. a third message) to the eNB using the UL grant (S12030). The third message should include an ID of the UE. This is because the eNB cannot determine which UEs perform the random access procedure in the contention-based random access procedure and the UEs need to be identified for contention resolution.

Two methods have been discussed to include a UE identifier in the third message. According to a first method, if the UE has a valid cell identifier already allocated by a corresponding cell before the random access procedure, the UE transmits its own cell identifier by a UL transmission signal corresponding to the UL grant. On the other hand, if a valid cell identifier has not been allocated to the UE before the random access procedure, the UE transmits its unique identifier (e.g., an S-TMSI or a Random ID) in the third message. In general, the unique identifier is longer than a cell identifier. Once the UE has transmitted data corresponding to the UL grant, the UE starts a contention resolution timer.

(4) Reception of Fourth Message

After the UE transmits data including its own identifier through the UL grant that is included in the random access response, the UE awaits an indication from the eNB for contention resolution. That is, the UE may attempt to receive a PDCCH in order to receive a specific message (S12040). The UE may receive the PDCCH using two methods. In the case in which the UE has transmitted the third message in response to the UL grant using a cell identifier as its own identifier, the UE may attempt to receive a PDCCH using its own cell identifier. In the case in which the UE has transmitted the third message in response to the UL grant using an identifier specific to the UE as its own identifier, the UE may attempt to receive a PDCCH using a temporary C-RNTI included in the random access response. In the former case, when the UE has received a PDCCH through its own cell identifier before the contention resolution timer expires, the UE may determine that the random access procedure has been properly performed and then terminate the random access procedure. In the latter case, when the UE has received a PDCCH through a temporary C-RNTI before the contention resolution timer expires, the UE checks data carried in a PDSCH indicated by the PDCCH. If the UE-specific identifier is included in the data, the UE may determine that the random access procedure has been properly performed and then terminate the random access procedure.

Hereinafter, an RRC state of a UE and an RRC connection mechanism will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled.

On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

An NAS (Non-Access Stratum) layer located in an upper RRC layer performs session management and mobility management.

In order to manage the mobility of the UE, two states of EMM-REGISTERED (EPS Mobility Management-REGISTERED) and EMM-DEREGISTERED are defined, and the two states apply to the UE and the MME. Initially, the UE is in the EMM-DEREGISTERED state, and in order for the UE to connect to the network, a process of registering to a corresponding network is performed through an initial attach procedure. When the attach procedure is successfully performed, the UE and the MME are in the EMM-REGISTERED state.

To manage a signaling connection between the UE and the EPC, two states of an ECM (EPS Connection Management)-IDLE state and an ECM-CONNECTED state are defined, and the two states are applied to the UE and the MME. When a UE in the ECM-IDLE establishes an RRC connection with the E-UTRAN, the corresponding UE is in the ECM-CONNECTED state.

When the MME in the ECM-IDLE state establishes an S1 connection with the E-UTRAN, the MME is in the ECM-CONNECTED state. When the UE is in the ECM-IDLE state, the E-UTRAN does not have context information of the UE. Therefore, the UE in the ECM-IDLE state performs a UE-based, mobility-related procedure such as cell selection or cell reselection without having to receive a command from the network. On the other hand, when the UE is in the ECM-CONNECTED state, the mobility of the UE is managed by a command from the network. When the location of the UE in the ECM-IDLE state is different from a location known to the network, the UE notifies the network of the UE's location through a tracking area update procedure.

Next, system information is described.

The system information includes essential information which must be known in order for a UE to connect to a base station. Therefore, the UE must receive all the system information before the UE is connected to the base station, and also the UE needs to have the latest system information. Since the system information is the information which must be known to all UEs within a cell, the base station periodically transmits the system information.

According to Section 5.2.2 of 3GPP TS 36.331 V8.7.0 (2009-09) "Radio Resource Control (RRC); Protocol specification (Release 8)," the system information is divided into MIB (Master Information Block), SB (Scheduling Block), and SIB (System Information Block). The MIB enables the UE to be aware of a physical configuration of a corresponding cell, for example, a bandwidth. The SB informs transmission information of the SIBs, for example, a transmission period. The SIB is a collection of system information that are related to one another. For example, a certain SIB includes information only about a surrounding cell and a certain SIB includes information only about an uplink radio channel used by the UE.

Generally, a service provided by the network to the UE can be divided into three types as below. In addition, the UE recognizes a cell type depending on which service is available. A service type is first described below and the cell type is described later.

1) Limited service: This service provides an emergency call and a disaster warning system (Earthquake and Tsunami Warning System; ETWS) and may be provided in an acceptable cell.

2) Normal service: This service means a public-use service for a general purpose and may be provided in a suitable or normal cell.

3) Operator service: This service means a service for a communication network operator, and this cell can be used only by the network operator, not by a general user.

Regarding the service type provided by the cell, the cell type may be classified as follows.

1) Acceptable cell: a cell in which the UE may be provided with a limited service. The cell is not barred and satisfies a cell's selection criteria.

2) Suitable cell: a cell in which the UE may be provided with a regular service. This cell satisfies a condition for the acceptable cell while satisfying additional conditions at the same time. The additional conditions are that this cell must belong to a PLMN (Public Land Mobile Network) to which a corresponding UE can connect and must be a cell in which the tracking area update procedure of the UE is not prohibited. If the corresponding cell is a CSG cell, this cell must be a cell to which the UE can connect to as a CSG member.

3) Barred cell: a cell which broadcasts information that the cell is barred through the system information.

4) Reserved cell: a cell which broadcasts information that the cell is reserved through the system information.

FIG. 13 is a flowchart showing an operation of a UE in an RRC idle state to which the present invention may apply.

FIG. 13 shows a procedure in which a UE is registered to a network through a cell selection process when the UE is initially powered on and a cell reselection is performed when necessary.

Referring to FIG. 13, the UE selects a Radio Access Technology (hereinafter, referred to as "RAT") for communicating with a Public Land Mobile Network (hereinafter, referred to as "PLMN") from which the UE itself desires to receive a service (S13010). The information about PLMN and RAT may be selected by the user of the UE, and what is stored in the USIM (universal subscriber identity module) may be also used.

The UE selects a cell having the largest value among the cells that the measured base station has a value greater than a particular value in the signal intensity and quality (cell selection) (S13020). Then, it receives SI being sent by the base station. The particular value denotes a value defined by a system to guarantee the quality of physical signals in the data transmission and/or reception. Accordingly, the value may vary based on the RAT to be applied.

The UE registers its own information (for example, IMSI) for receiving a service (for example, paging) from a network (S13030). Here, the UE is not registered into a network to be accessed whenever selecting a cell but registered into a network in case when network information received from SI (for example, Tracking Area Identity (TAI)) is different from network information that the UE itself knows.

The UE performs cell re-selection based on a service environment provided in a cell, a UE environment, or the like (S13040). If a value of the signal intensity and quality measured by the base station from which the UE receives a service is less than a value measured by the base station of the neighboring cell, then the UE selects one of the other cells providing signals having better characteristics than those of the cell of the base station being accessed by the UE. This process is called a cell reselection to distinguish it from an initial cell selection in the second step. At this time, a time restriction condition may be specified in order to prevent a cell from being frequently reselected based on the change of the signal characteristics.

FIG. 14 is a flowchart showing an RRC connection establishment procedure to which the present invention may apply.

A UE sends to a network an RRC connection request message for requesting an RRC connection (S14010). The network sends an RRC connection setup message in response to the RRC connection request (S14020). After receiving the RRC connection setup message, the UE enters an RRC connection mode.

The UE sends to the network an RRC connection setup complete message used to confirm successful completion of the RRC connection establishment (S14030).

FIG. 15 is a flowchart showing an RRC connection reconfiguration procedure to which the present invention may apply.

An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (S15010). In response to the RRC connection reconfiguration, the UE sends to the network an RRC connection reconfiguration complete message used to confirm successful completion of the RRC connection reconfiguration (S15020).

The following is a detailed description of a procedure of selecting a cell by a UE.

When power is turned-on or the UE is located in a cell, the UE performs procedures for receiving a service by selecting/reselecting a suitable quality cell.

A UE in an RRC idle state should prepare to receive a service through the cell by always selecting a cell of a proper quality. For example, a UE where power is turned-on just before should select a cell of a proper quality to registered in a network. If the UE in an RRC connection state enters in an RRC idle state, the UE should select a cell for stay in the RRC idle state. In this way, a procedure of selecting a cell satisfying a certain condition by the UE in order to be in a service idle state such as the RRC idle state refers to cell selection. Since the cell selection is performed when a cell in the RRC idle state has not been selected, it is important to select the cell as soon as possible.

Accordingly, as long as the cell provides more than a certain level of radio signal quality, the cell may be selected during a cell selection procedure of the UE, even if the cell does not provide the best radio signal quality.

A method and procedure of selecting a cell by a UE in a 3GPP LTE is described with reference to 3GPP TS 36.304 V8.5.0 (2009-03) "User Equipment (UE) procedures in idle mode (Release 8)".

A cell selection is largely divided into two processes.

The first process is an initial cell selection process. In this process, UE does not have preliminary information about a wireless channel. Accordingly, the UE searches all wireless channels to find a suitable cell. The UE searches for the strongest cell in each channel. Thereafter, once the UE finds a suitable cell that satisfies cell selection criteria, the UE selects the corresponding cell.

Next, the UE may select the cell using stored information or using information broadcasted by the cell. Accordingly, cell selection may be quickly done compared to an initial cell selection process. As long as the UE finds a cell that satisfies the cell selection criterion, the UE selects the corresponding cell. If any suitable cell that satisfies the cell selection criterion is not found though such a process, the UE performs an initial cell selection process.

After the UE selects a certain cell through a cell selection process, the signal strength and quality between the UE and the base station may be changed due to the change of the UE mobility and wireless environment. Therefore, if the quality of the selected cell is deteriorated, the UE may select another cell providing better quality. If a cell is reselected in this manner, this cell, in general, should be a cell that provides better signal quality than the currently selected cell.

This process is called a cell reselection. In terms of radio signal quality, in general, a basic purpose of the cell reselection process is to select a cell providing best quality to the UE.

Apart from radio signal quality, the network may determine the priority for each frequency and notify the UE about this. Upon receiving the priority, the UE may take this priority into consideration more than the radio signal quality criterion during the cell reselection process.

As described above, there is a method of selecting or reselecting a cell based on the signal property of the wireless environment. When a cell is selected for reselection in the cell reselection process, the following cell reselection methods may be used, based on the RAT and frequency characteristics of the cell.

Intra-frequency cell reselection: A reselected cell is a cell having the same RAT and same center-frequency as a cell on which the UE is currently camping.

Inter-frequency cell reselection: A reselected cell is a cell having the same RAT as a cell on which the UE is currently camping but has a different center-frequency than it.

Inter-RAT cell reselection: A reselected cell is a cell using a RAT different from the RAT of a cell on which the UE is currently camping.

The principles of the cell reselection process are as follows.

First, the UE measures the qualities of a serving cell and a neighboring cell for the cell reselection.

Second, the reselection is performed based on the cell reselection criterion. The cell reselection criterion has the following features in relation to the measurement of the serving cell and the neighboring cell.

The intra-frequency cell reselection is basically based on ranking. The ranking defines an index value for evaluating the cell reselection and the cells are ordered in the order of the index value by using the index value. A cell having the best index is generally called the best ranked cell. The cell index value is basically a value obtained by the UE measures on the corresponding cell, to which a frequency offset or cell offset is used as necessary.

The inter-frequency cell reselection is based on a frequency priority provided by the network. The UE attempts to camp on a frequency having the highest frequency priority. The network may provide the frequency priority common for in-cell UEs through broadcast signaling or provide a frequency-specific priority for each UE through UE-dedicated signaling. The cell reselection priority provided through broadcast signaling may be called a common priority, and the cell reselection priority set for each UE by the network may be called a dedicated priority. If the UE receives the dedicated priority, the UE may receive the relevant validity time along with the dedicated priority. Upon receiving the dedicated priority, the UE starts the validity timer which is set to the received validity time. The UE applies the dedicated priority in the RRC idle mode while the validity timer is operating. When the validity timer expires, the UE discards the dedicated priority and applies the common priority again.

For the inter-frequency cell reselection, the network may provide the UE with a parameter (e.g., a frequency-specific offset) used in cell reselection for each frequency.

For the intra-frequency cell reselection or the inter-frequency cell reselection, the network may provide the UE with a Neighboring Cell List (NCL) used in cell reselection. The NCL includes a cell-specific parameter (e.g., a cell-specific offset) used in cell reselection.

For the intra-frequency or inter-frequency cell reselection, the network may provide the UE with a cell reselection black list used in cell reselection. The UE does not perform cell reselection on a cell included in the black list.

Hereinafter, RLM (Radio Link Monitoring) is described.

A UE monitors downlink quality based on a cell-specific reference signal in order to detect downlink radio link quality of a PCell.

The UE estimates downlink radio link quality for the purpose of monitoring the downlink radio link quality of the PCell and compares the estimated quality with thresholds Qout and Qin. The threshold Qout is defined as a level that does not allow for stable reception via a downlink radio link, and this corresponds to a 10% block error rate of hypothetical PDCCH transmission considering PDFICH errors. The threshold Qin is defined as a downlink radio link quality level that allows for more stable reception than the threshold Qout, and this corresponds to a 2% block error rate of hypothetical PDCCH transmission, with PCFICH errors taken into account.

Hereinafter, a radio link failure (RLF) is described.

A UE continues to perform measurement in order to maintain the quality of a radio link with a serving cell receiving a service. The UE determines whether or not communication is impossible under the current circumstance due to a deterioration of the quality of the radio link with the serving cell.

If the quality of the serving cell is too low and thus communication is nearly impossible, the UE determines the current circumstance as a radio link failure.

If a radio link failure is determined, the UE abandons maintaining communication with the current serving cell, selects a new cell through a cell selection (or cell reselection) procedure, and attempts an RRC connection re-establishment to the new cell.

The UE, if the following problems occur on the radio link, may determine that RLF has occurred.

(1) First, it may be determined that RLF has occurred due to a physical channel problem.

If the quality of RS (reference signal) periodically received from an eNB over a physical channel is detected as equal to or smaller than a threshold, the UE may determine that an out-of-sync condition has occurred in the physical channel. If the out-of-sync condition occurs consecutively a specific number of times (e.g., N310), an RRC is notified about this. Having received an out-of-sync message from a physical layer, the RRC runs a timer T310, and waits for the problem with the physical channel to be solved while the timer T310 is running. If the RRC receives a message indicating that an in-sync condition has occurred consecutively a specific number of times (e.g., N311), from the physical layer while the timer T310 is running, the RRC determines that the physical channel problem has been solved and then stops the running timer T310. On the contrary, if the RRC receives no in-sync message until the timer T310 expires, the RRC determines that an RLF has occurred.

(2) It may be determined that an RLF has occurred due to a MAC random access problem.

The UE, while performing the random access procedure at the MAC layer, goes through random access resource selection→random access preamble transmission→random access response reception→contention resolution. The above overall process is referred to as one random access procedure, and unless this procedure is successfully done, the next random access procedure is carried out after waiting a backoff time. If such a random access procedure is unsuccessful despite a predetermined number (e.g., preambleTransMax) of attempts, the RRC is informed about this, and the RRC then determines that an RLF has occurred.

(3) It may be determined that an RLF has occurred due to an RLC maximum retransmission problem.

If AM (Acknowledged Mode) RLC is used at the RLC layer, the UE retransmits an RLC PDU that was not successfully transmitted.

However, if a predetermined number of (e.g., maxRetxThreshold) of attempts to retransmit a specific AMD PDU do not succeed in the AM RLC, the RRC is informed about this and the RRC then determines that an RLF has occurred.

The RRC determines that an RLF occurs due to the above three reasons. If an RLF occurs thusly, an RRC connection re-establishment is performed to re-establish an RRC connection with the eNB.

The RRC connection re-establishment procedure is performed as follows when an RLF occurs.

If the UE determines that a serious problem with an RRC connection has occurred, it performs an RRC connection re-establishment procedure in order to re-establish a connection with the eNB. The serious problem with the RRC connection may include the following five problems: (1) radio link failure (RLF); (2) handover failure; (3) mobility from E-UTRA; (4) PDCP integrity check failure; and (5) RRC connection reconfiguration failure.

If one of the above problems occurs, the UE runs the timer T311 and initiates an RRC connection re-establishment procedure. During this procedure, the UE goes through a cell selection random access procedure to connect to a new cell.

If a suitable cell is found through a cell selection procedure while the timer T311 is running, the UE stops the timer T311 and starts a random access procedure to the corresponding cell. However, if the UE cannot find a suitable cell until the timer T311 expires, the UE regards it an RRC connection failure and transitions to RRC_IDLE mode.

Hereinafter, the RRC connection re-establishment procedure will be described in more detail.

FIG. 16 is a view showing an example of an RRC connection re-establishment procedure to which the present invention may apply.

Referring to FIG. 16, the UE stops using all configured radio bearers except SRB 0 (Signaling Radio Bearer #0) and initializes various sub-layers of AS (Access Stratum) (S16010). Further, the UE sets up each sub-layer and physical layer as default configuration. During such procedure, the UE maintains the RRC connection state.

The UE performs a cell selection procedure for conducting an RRC connection reestablishment procedure (S16020). Although the UE maintains the RRC connection state during the RRC connection reestablishment procedure, the cell selection procedure may be performed in the same way as the cell selection procedure performed by the UE in the RRC idle mode.

After performing the cell selection procedure, the UE identifies the system information on a corresponding cell to determine whether the corresponding cell is a proper cell (S16030). If the selected cell is determined to be a proper E-UTRAN cell, the UE sends an RRC connection reestablishment request message to the corresponding cell (S16040).

On the other hand, if the cell selected through the cell selection procedure for performing the RRC connection reestablishment procedure is determined to be a cell using an RAT other than the E-UTRAN, the UE stops the RRC connection reestablishment procedure and enters the RRC idle state (S16050).

The UE may be implemented to complete checking whether the cell is proper within a limited time through the cell selection procedure and reception of the system information on the selected cell. To this end, the UE may run a timer as the UE initiates the RRC connection reestablishment procedure. If it is determined that the UE has selected a proper cell, the timer may be stopped. When the timer expires, the UE considers it a failure of the RRC connection reestablishment procedure and may enter the RRC idle mode. This timer is hereinafter referred to as a radio link failure timer. According to the LTE spec. TS 36.331, a timer named T311 may be used as the radio link failure timer. The UE may obtain set values for the timer from the system information of the serving cell.

Upon receiving the RRC connection reestablishment request message from the UE and accepting the request, the cell transmits an RRC connection reestablishment message to the UE.

Upon receiving the RRC connection reestablishment message from the cell, the UE reconfigures a PDCP sub-layer and an RLC sub-layer for SRB1. Further, the UE recalculates various key values relating to security configuration and reconfigures the PDCP sub-layer that is in charge of security with the newly calculated security key values.

By doing so, SRB 1 between the UE and the cell is opened, and RRC control messages may be communicated therebetween. The UE completes resuming SRB1 and sends to the cell an RRC connection reestablishment complete message indicating that the RRC connection reestablishment procedure is complete (S16060).

On the contrary, unless the cell receives the RRC connection reestablishment request message from the UE and accepts the request, the cell transmits an RRC connection reestablishment reject message to the UE.

Once the RRC connection reestablishment procedure is successfully done, the cell and the UE perform an RRC connection reestablishment procedure. By doing so, the UE restores to the state as it was before performing the RRC connection reestablishment procedure and guarantees maximum service continuity.

Next, RLF reporting is now described.

The UE, if an RLF or handover failure occurs, reports such a failure event to the network in order to support MRO (Mobility Robustness Optimisation) of the network.

After the RRC connection reestablishment, the UE may provide an RLF report to the eNB. The radio measurements contained in the RLF Report may be used to identify coverage issues as the potential cause of the failure. This information may be used to exclude those events from the MRO evaluation of intra-LTE mobility connection failures and redirect them as input to other algorithms.

In case the RRC re-establishment fails or the UE does not perform any RRC re-establishment, the UE may make the RLF Report available to the eNB after reconnecting from idle mode. For this purpose, The UE stores the latest RLF or handover failure related information, and indicates RLF report availability at each subsequent LTE RRC connection (re-)establishment and handover to an LTE cell until the RLF report is fetched by the network or for 48 hours after the RLF or handover failure is detected.

The UE keeps the information during state transitions and RAT changes, and indicates RLF report availability again after it returns to the LTE RAT.

Availability of the RLF Report at the RRC connection setup procedure is the indication that the UE suffered from a connection failure and that the RLF Report from this failure was not yet delivered to the network. The RLF Report from the UE includes the following information:

The E-CGI of the last cell that served the UE (in case of RLF) or the target of the handover (in case of handover failure). If the E-CGI is not known, the PCI and frequency information are used instead.

E-CGI of the cell that the re-establishment attempt was made at.

E-CGI of the cell that served the UE at the last handover initialization, i.e. when message 7 (RRC Connection Reconfiguration) was received by the UE.

Time elapsed since the last handover initialization until connection failure.

An indication whether the connection failure was due to RLF or handover failure.

The radio measurements.

Location of failure

The eNB receiving the RLF Report from the UE may forward the report to the eNB that served the UE before the reported connection failure. The radio measurements contained in the RLF Report may be used to identify coverage issues as the potential cause of the failure. This information may be used to exclude those events from the MRO evaluation of intra-LTE mobility connection failures and redirect them as input to other algorithms.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like. Measurement for such a purpose is generally called radio resource management (RRM) measurement.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identity (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band.

Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement.

The UE performs the intra-frequency measurement and reports a measurement result to the network at a proper time, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network at an appropriate time.

When the UE supports measurement on a heterogeneous network based on different RATs, measurement on a cell of the heterogeneous network may be performed according to a configuration of a base station. Such a measurement is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 18:
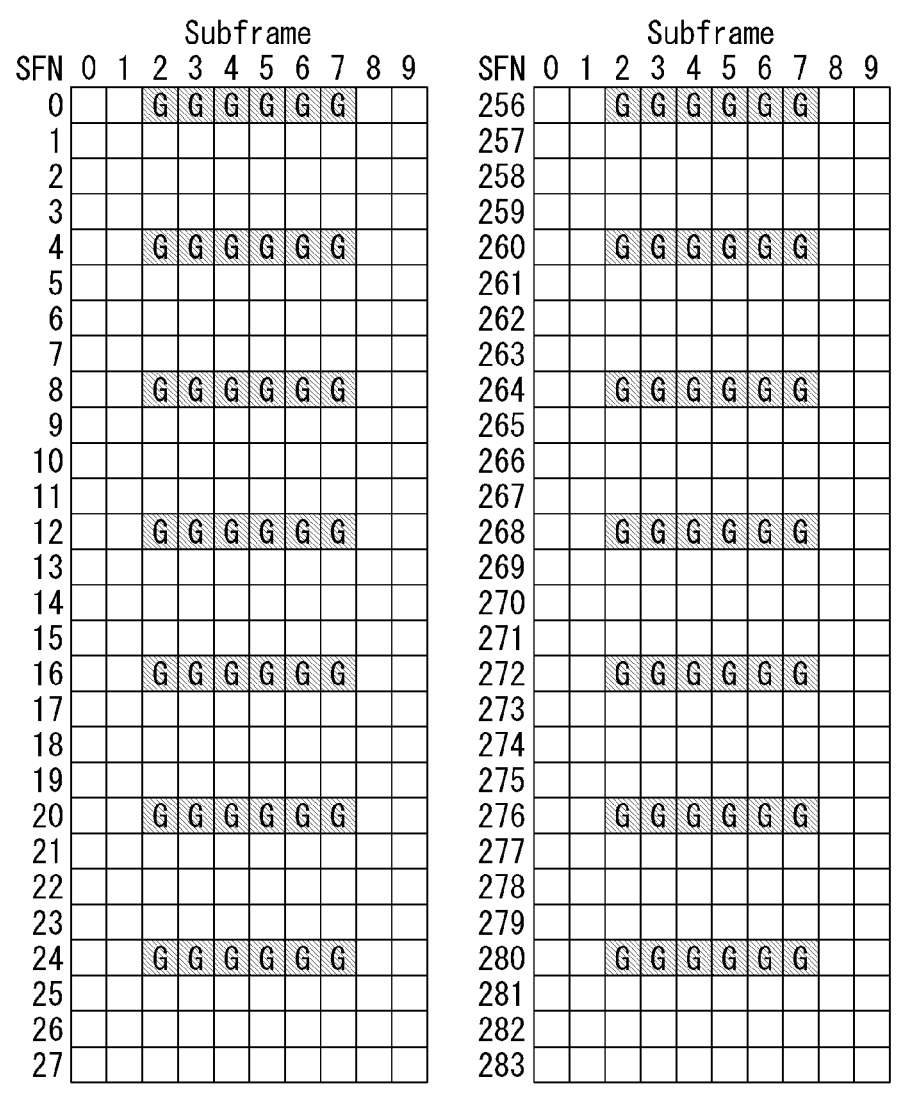

FIGS. 17 and 18 are diagrams showing an example of a measurement execution method and a setting of a measurement gap to which the present invention can be applied.

A UE receives measurement configuration information from a base station (S17010). A message including the measurement configuration information is referred to as a measurement configuration message. The UE performs measurement based on the measurement configuration information (S14020). If a measurement result satisfies a reporting condition included in the measurement configuration information, the UE reports the measurement result to the base station (S14030). A message including the measurement result is referred to as a measurement report message.

The measurement configuration information may include the following information.

(1) Measurement object information: The is information about an object on which the UE will perform measurement. The measurement object includes at least one of an intra-frequency measurement object which is an object of measurement within a cell, an inter-frequency measurement object which is an object of measurement between cells, and an inter-RAT measurement object which is an object of inter-RAT measurement. For example, the intra-frequency measurement object may indicate a neighboring cell having the same frequency band as a serving cell, the inter-frequency measurement object may indicate a neighboring cell having a different frequency band from that of the serving cell, and the inter-RAT measurement object may indicate a neighboring cell with a different RAT from that of the serving cell.

(2) Reporting configuration information: This is information about a report condition regarding the time when UE reports a measurement result and a report type. The report configuration information may consist of a list of report configurations. Each report configuration may include a reporting criterion and a reporting format. The report criterion is a criterion that triggers the transmission of a measurement result by UE. The reporting criterion may be the cycle of a measurement report or a single event for a measurement report. The reporting format is information about that UE will configure a measurement result using what type.

(3) Measurement identity information: this is information about a measurement identity that associates a measurement object with a reporting configuration so that UE determines to report what measurement object when and in what type. The measurement identity information may be included in a measurement report message and may be indicative that a measured result is about what measurement object and that a measurement report has occurred due to what report condition.

(4) Quantity configuration information: this is information about a parameter for setting the filtering of a measurement unit, a report unit and/or a measured result value.

(5) Measurement gap information: this is information about a measurement gap, that is, a section that may be used for UE to perform only measurement by not taking into consideration data transmission with a serving cell because downlink transmission or uplink transmission has not been scheduled.

Table 2 below is a table showing an example of the pattern of the measurement interval.

TABLE 2

| Gap pattern ID | Measurement gap length (MGL, ms) | Measurement gap repetition period (MGL, ms) | inter frequency measurement for 480 ms and mimimum use time for RAT measurement | Object of measurement |
|---|---|---|---|---|
| 0 | 6 | 40 | 60 | Inter-Frequency E-UTRAN DFF and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

FIG. 18 shows an example in which a measurement interval is set when a gp (gap pattern) is 40 ms and a gapoffset is set to 2.

A UE has a measurement object list, a measurement reporting configuration list, and a measurement identity list, in order to perform the measurement procedure.

In 3GPP LTE, a base station may configure only one measurement object in UE with respect to a single frequency band. In accordance with Paragraph 5.5.4 of 3GPP TS 36.331 V8.5.0 (2009-03) "Evolved Universal Terrestrial Radio Access (E-UTRA) Radio Resource Control (RRC); Protocol specification (Release 8)," events that trigger measurement reports are defined in the following table 3.

TABLE 3

| Event | Reporting Condition |
|---|---|
| Event A1 | Serving becomes better than threshold |
| Event A2 | Serving becomes worse than threshold |
| Event A3 | Neighbour becomes offset better than Serving |
| Event A4 | Neighbour becomes better than threshold |
| Event A5 | Serving becomes worse than threshold1 and neighbor becomes better than threshold2 |
| Event B1 | Inter RAT neighbour becomes better than threshold |
| Event B2 | Serving becomes worse than threshold1 and inter RAT neighbor becomes better than threshold2 |

If the measurement result of the UE satisfies a set event, the UE sends a measurement report message to the base station.

One of the areas which are getting more and more important and are currently specified in 5G mobile communication technology is the reliable communication.

Reliable Communication refers to new communication services that are realized via error free transmission or service availability to implement mission critical services (MCS).

The necessity of reliable communication has been recognized since it is a part of M2M (machine-to-machine) communication that satisfies real-time requirements for traffic safety, traffic efficiency, E-health, efficient industrial communication, and so on.

Moreover, reliable communication needs to provide reliable connections for delay-sensitive applications such as traffic safety or special-purpose mission critical MTCs (machine-type communications).

In addition, the necessity of reliable communication is recognized for purposes like medical/emergency response, remote control, sensing, etc.

MCSs are expected to see significant improvements in terms of End-to-End Latency, Ubiquity, Security, Availability/Reliability, etc. compared to the conventional UMTS/LTE and LTE-ANVi-Fi.

That is, the commercialized wireless technologies (including 3GPP LTE and LTE-A) proposed up to now fail to guarantee the adequate performance for providing various MCSs in the aspect of the Real-Time requirements and the Reliability requirements.

Furthermore, the metric of reliability may be an 'evaluation criterion for describing the quality of a radio link connection to satisfy a specific service level'.

Also, metrics for service availability may be called RLA (radio link availability), and the QoE (quality of experience) of the UE may be defined as $RLA=Pr(RLQ>=QoE)$ when expressed in terms of link quality.

Here, RLQ is radio link quality, and QoE is QoE requirements from the perspective of link quality.

In addition, scenarios applicable to 5G mobile communication environments for MCSs may include the following services, for instance.

Transport of heavy loads by remotely controlling robot arms to realize Industrial Automation or remotely controlling Automated Guided Vehicles (AGVs).

Remote control of drones to provide physical distribution, remote healthcare services, and other various public services.

Safe exchange of information required between vehicles to provide autonomous vehicle service or safe delivery of safety signals indicating a hidden vehicle or forward collision, not detected by a vehicle sensor (e.g., camera, radar, etc.).

In the case that the radio link (serving link) quality of a serving base station is degraded to an extent of not proper for MCSs although another available alternative base station link is determined, the above-mentioned services should be provided continuously.

Accordingly, in the case that the degradation of the radio link quality of a serving base station is detected and it is determined that the radio link quality of the serving base station is not proper for providing MCSs, a method is required for activating another multilink quickly and for configuring an MCS bearer through the activated multilink.

Owing to the reasons, in order for reliable communication of 5G to be available, a UE utilizes all radio links around and gives indication so as to maximize the radio link according to situations, and therefore, the decrease of radio link outage for providing MCS should be considered an essential element.

Moreover, in conventional LTE/LTE-A systems, a UE controls RLF based on a plurality of timers.

As mentioned previously, the UE is not able to recognize RLF before a specific timer (e.g., T310) expires, and the UE maintains an RRC connection or transitions to RRC Idle state depending on whether an RRC connection re-establishment procedure is successful or not before another timer (e.g., T311) expires.

Future 5G mobile communication should satisfy an error rate less than 10-6 and RLA requirements less than 10-6 in order to support MCS such as industrial automation, drone remote control, and autonomous vehicle driving.

As such, the goal of 5G is to build a high-reliability system that allows a UE to always get MCSs without feeling radio link outage.

However, the current LTE/LTE-A system is designed to process the recovery from the Radio Link Failure (RLF) very conservatively. Owing to this, it may be difficult to search other alternative available base stations quickly according to the channel situation of UE, and to secure alternative available base station for the activation of connection to the corresponding alternative base stations.

To solve this, methods have been proposed to preserve alternative link base stations that can quickly replace a serving base station when the channel status of a serving base station gets worse by allowing a UE to secure a plurality of base station links when connecting to a network.

That is, in a conventional method to be described below, a method will be described in which a UE configures multiple connections (or multi-links) to a plurality of base stations by transmitting to a base station an indication for indicating that the UE is an MCS-capable UE when the UE connects to a network.

However, even when multiple connections are established between a UE and a plurality of base stations, if the same measurement gap is set for the serving base station and the alternative base stations and the same measurement gap is applied to the UE, the UE cannot transmit/receive uplink/downlink data to/from the serving base station and the alternative base stations.

Therefore, the present invention proposes a method of transmitting and receiving data by not applying the measurement gap when MCS data is generated.

The terms used below are defined as follows.

Multi-link refers to a plurality of wireless links in which a UE has a connection with a plurality of base stations.

The multi-link may include a serving link and at least one multi-link.

The serving link indicates a wireless link in which a UE has a connection with a serving base station, and the multi link indicates a wireless link in which a UE has a connection with a base station other than a serving base station.

The meaning of the multi-link and related operations will be described in more detail with reference to FIG. 19 later.

Here, the base station other than the serving base station may be represented as an alternative base station, a candidate (target) base station, a neighbor base station, a target base station, or the like.

The serving BS refers to a base station that has an active RRC connection with the UE and is currently receiving the service.

The alternative serving base station represents a new serving base station that replaces the serving base station at a radio link quality deterioration (or degradation) of the serving base station, which will be described later.

The alternative serving base station may be any one of the alternative base stations having the alternative link of the SRB Inactive (RRC Deactivated) state. Alternatively, the alternative serving base station may be an alternative base station in which the alternative link in the SRB Inactive state is transited to the alternative link in the SRB Active state in accordance with deterioration in link quality of the serving base station.

The additional alternative base station represents an alternative base station in which a multi-link is additionally discovered by a UE other than the preset alternative base station to be described later so that the multi-link is additionally set.

A link connection refers to a radio connection with a base station, and may be represented by a radio link setup, radio link establishment, etc.

Also, multi-link connections (or setups) may be represented by multiple connections, alternative link connections, etc.

Hereinafter, multi-link setup and alternative link setup may be interchangeably used as necessary.

Multi-Link Definitions and Related Actions

FIG. 19 is a conceptual diagram of a multi-link to which the methods proposed in the present specification can be applied.

As previously defined, multiple connections or multi-links include a serving link and at least one multi-link.

The serving link refers to a radio link between UE and a serving base station, for which both SRB (signaling radio bearer) and DRB (data radio bearer) are generally active.

An alternative link indicates a radio link between a UE and at least one alternative base station, in which an SRB and a DRB in an inactive state are set.

The multi-link is activated by an instruction to activate the UE or the serving BS, and is a link concept having a state different from a general dormant mode, and may be an event-triggered dormant mode.

That is, a UE having a multi-link in an SRB inactive state with an alternative base station sends an activation instruction directly to an alternative base station or sends an activation request to a serving base station, and remains in a sleep state in the alternative link until receiving a response thereto.

This means that the UE can transmit the RRC message directly to the alternative base station via the alternative link at any time, and the alternative base station can transmit the RRC message to the UE only after receiving the activation indicator from the UE directly or through the serving BS.

In addition, the UE can receive information on the maximum number of multi-links that can be connected to the neighboring alternative base station through a broadcast message such as SIB from the serving base station in advance.

In addition, when the UE does not exceed the set maximum number of multi-links, the UE can additionally set up a multi-link with neighboring alternative base stations satisfying the specific condition (QMCS).

How to Set Up Multilink

First, before examining a method for transmitting and receiving data at the measurement gap proposed in the present specification, a method for setting up a multi-link by a UE when connecting to a network, a method for setting a network indication-based multi-link, and a method of setting a multi-link according to the quality of link will be briefly considered.

A method of establishing a multi-link in a network connection is related to a method of setting, by the UE, a multi-link with a neighboring alternative base station when the UE is connected to the network.

Herein, the case that the UE is connected to the network may be an initial network connection procedure of the UE, a network connection procedure in the case that Mission Critical Service (MCS) is generated in the idle state, etc.

That is, it relates to a method of establishing a multi-link with an alternative base station in order to support MCS when a UE accesses a network.

In addition, the method of establishing the multi-link in the network connection can be applied to both of (1) there is no need to synchronize the UE with the alternative base station, and (2) the case where synchronization between the UE and the alternative base station should be synchronized.

Here, the case that synchronization does not need to be performed corresponds to (1) a "small cell environment" in which the timing advance (TA) between the UE and the alternative base station (or the small base station) reaches almost 0 or (2) an environment where an asynchronous system based on a new waveform is built.

In contrast, the method of establishing the network indication based multi-link is a method for solving the problem of unnecessarily setting up multiple connections when the UE is not always provided with the MCS. When the MCS is provided to the UE connected to the RRC, multiple connections may be set or cancelled as needed.

The method of setting up the multi-link according to the link quality value may set or release the multiple connection according to the change of the link quality value indicator indicating the radio link quality of the serving base station or is the alternative base station. Unlike the method of setting up the multi-link in the network connection and the method of setting the network-indication-based multi-link as described above, the method of setting up the multi-link according to the link quality value allows the UE to set multiple connections before the wireless link quality deteriorates as the serving or alternative base station informs the UE of the link quality value indicator before the substantial wireless link quality deteriorates.

In this way, when a UE has a multi-link with a plurality of base stations, the UE has an active state link (serving link in an active state) with the serving base station, and has an inactive state link (multi-link in an inactive state) with the alternative base station.

The serving link in the active state means that the UE establishes an active SRB (Signaling Radio Bearer)/an active DRB (Data Radio Bearer) with the serving BS, and the multilink in the inactive state may mean that the UE sets an inactive SRB and an active DRB with the alternative base station.

Also, through the network connection, the serving base station sets up the E-RAB by setting up the S-GW and the S1-U Bearer, which means that the EPS Bearer is set together with the S5/S8 Bearer between the S-GW and the P-GW.

On the other hand, the alternative base station that sets up the multi-link with the UE sets up the S-GW and the S1-U Bearer, and sets the DRB with the UE, and thus the E-RAB is set. In this case, the P-GW and the S5/S8 bearer can be similarly set.

As described above, inactive SRB (or SRB inactive state) is different from a general dormant mode or domain state in LTE/LTE-A systems.

The SRB inactive state may be represented by SRB inactive mode.

That is, the general dormant mode refers to a mode that is used for power saving of an RRC-connected UE.

For example, when there is not data for UE to receive in DL, the UE enters the dormant mode and periodically sleeps and wakes up repetitively to reduce unnecessary power consumption of the UE.

On the contrary, the SRB inactive mode (or state) used in this specification refers to a state in which the UE continues to sleep if there is no SRB activate indication.

The SRB inactive mode may be defined as a state activated by an instruction of the UE or the serving BS.

Accordingly, the SRB inactive mode may be represented by an event-triggered dormant mode.

As described previously, when multi-tier/multi-layer base stations exist within the UE's coverage (in-coverage situation), if the UE determines that the quality of the serving link is not enough to get MCS, the UE may be provided with MCS reliably and seamlessly by securing radio links with other base stations, i.e., alternative base stations, that ensure better radio link quality than the serving base station does.

In addition, the following four modes can be considered according to the active or inactive states of the SRB and DRB of the multi-link between the UE and the alternative base station.

1. First mode: SRB Inactive and DRB Inactive
2. Second mode: SRB Inactive and DRB Active
3. Third mode: SRB Active and DRB Inactive
4. Fourth mode: SRB Active and DRB Active In the methods proposed in the present specification, the second mode and the fourth mode, that is, two cases will be considered.

Specifically, in the second mode (SRB Inactive state/DRB Active state), the RRC connection of the alternative base station is inactivated, but when there is an alternative base station link satisfying the deteriorated link quality value due to deterioration of the link quality value of the serving base station, the DRB of the alternative base station is set and the serving base station and the alternative base station can perform simultaneous transmission.

In the second mode, an EPS Bearer satisfying the QoS for the MCS can be set, and the DRB is set.

The fourth mode (SRB active state/DRB active state) is a state in which the deactivated RRC connection is activated by a separate activation indicator to exchange RRC messages between the UE and the base station.

In the fourth mode, the EPS bearer satisfying the QoS for the MCS can be set, and the DRB is set.

FIG. 20 is a flowchart illustrating an example of a method for transmitting downlink data in a measurement gap proposed in the present specification.

Referring to FIG. 20, a network node may transmit indication information indicating that a measurement gap is not applied when MCS data is generated, and may transmit the data to the UE.

Specifically, the network node (e.g., Mobility Management Entity, MME) transmits a request message for requesting the setting of the E-RAB to the serving base station (S20010).

The request message may include multi-link setup indication information for the MCS and indication information indicating that the measurement gap is not applied when the MCS data is generated in the measurement gap.

The request message may include E-RAB QoS parameters related to the MCS as well as Multi-Connection Setup Indication information.

In this way, an MCS bearer establishment procedure between the UE and the base stations (the serving base station and the alternative base station) is performed (or started).

Upon receiving the indication information through the request message, the serving BS knows that the measurement gap may not be applied when MCS data is generated.

That is, when the MCS data is generated at the predetermined measurement gap through the instruction information, the serving BS can transmit and receive the data without performing the measurement.

The Multi-Connection Setup Indication information indicates an indicator for instructing multi-link (or alternative link) setup between the UE and at least one alternative BS.

One of the E-RAB QoS parameters associated with the MCS may be a Quality of Service (QoS) class identifier (QCI) of the MCS and the E-RAB QoS parameters may be included in an E-RAB QoS Parameters IE.

That is, the serving BS can know what the service related to the MCS bearer setting is (which QoS the service has) through the received E-RAB QoS Parameter.

Accordingly, the serving BS can set up a DRB (Data Radio Bearer) for the service having a specific QoS with the UE.

In summary, when an MCS is to be provided to a specific UE, a network entity (e.g., an MME) notifies the serving BS through the S1 signaling that the MCS Bearer should be set.

Through this, the serving BS can set a DRB for the MCS with the UE, and instruct the UE to set up a multi-link or an alternative link for the UE, if necessary.

Thereafter, the serving base station transmits a Load Query Request message to the alternative base stations (alternative base stations 1 and 2) to grasp the current load state of each alternative base station (S20020).

The alternative base stations (alternative base stations 1 and 2) transmit a load query response message to the serving base station in response to the load query request (S20030).

The load query response message includes information on the current load state of the alternative base station.

The load state can be expressed as High/Medium/Low.

Thereafter, the serving BS transmits a Multi-Link Connection Request message to the alternative base stations (alternative BSs 1 and 2) to request a multi-link connection with the UE (S20040).

The representation of the multi-link connection request message is an example, and may be referred to as various terms such as a multiple connection request message, an alternative link connection request message, an alternative link reservation request message, and a setting request message.

The multi-link connection request message may include a UE identifier (UE ID), UE Context information, Signaling Radio Bearer (SRB) Deactivate Indication information, etc.

The SRB Deactivate Indication information indicates an indicator for setting an SRB state of an alternative link established with the alternative base station to be inactive (or event-triggered Dormant mode).

The serving BS receives a multi-link connection response message in response to the multi-link connection request message from the alternative base stations (alternative base stations 1 and 2) (S20050).

The multi-link connection response message may also be referred to as another term as shown in the multi-link connection request message.

In addition, the multi link connection response message includes information on the alternative base station.

That is, the multi-link connection response message includes the C-RNTI of the alternative base station, the result (success/failure) information of the multi-link connection request, the TA tracking indication information for acquiring synchronization between the UE and the alternative base station, the TA tracking period information, etc.

The TA tracking indication information and the TA tracking period information correspond to information necessary for acquiring synchronization when the UE and the substitute base station are not synchronized according to the movement of the UE.

Thereafter, the serving BS transmits information received from the alternative base stations (alternative base stations 1 and 2), indication information transmitted from the MME, and frame information indicating information of the subframe on which the data is transmitted to the UE through the step S20050 to notify the UE of the points related to the multilink connection setting, that is, the point that an alternative link has been set with the alternative base stations (alternative base stations 1 and 2) to thereby instruct the UE to receive downlink data without performing inter-frequency measurement in a measurement gap which has been set in the SFN in advance (S20060).

The frame information may include an SFN (System Frame Number) to which the MCS data is to be transmitted.

The RRC connection reconfiguration message may further include a Radio Bearer Quality of Service (QoS), Session Management Request information, and EPS RB ID information for notifying that the MCS Bearer has been set.

The time point at which the indication inforamtion the SFN are transmitted may be the point of time when, after transmitting the indication information and the SFN and then transmitting data according to the indication information and the SFN information, the section required for receiving ACK/NACK about this is set not to be overlapped with the measurement gap.

For example, in FIG. 18, when the measurement gap is set to the fourth SFN (43 to 48 subframes) and the downlink data is scheduled to be transmitted in the measurement gap, the point of time when the indication information and the SFN are transmitted may be selected among 9 to 42 subframes (when data transmission and ACK/NACK reception according to the indication information and SFN transmission are possible within 34 ms).

Then, the UE transmits an RRC Connection Reconfiguration Complete message to the serving BS to notify that the setup of the multi-link connection to the alternative BSs 1 and 2 is completed (S20070).

As shown in FIG. 20, the serving base station continues to maintain the list of alternative base stations, and may update the list as needed.

FIG. 20 shows an example of a method of setting up an alternative link between a UE and an alternative base station according to a network (MME) instruction when there is no need to synchronize the UE with the alternative base station, and the present embodiment can be applied when synchronization is not necessary.

In addition, if downlink data transmission of the MCS continues until the next measurement gap as well as the measurement gap set in the fourth SFN, the serving base station does not perform measurement in the number of measurement gaps capable of data transmission/reception, and the number of times of data transmission/reception can be transmitted to the UE.

At this time, the number of times may be included in the frame information and transmitted to the UE.

Through this method, even when the data of the MCS is generated at the measurement gap, the service can be continuously provided without interrupting the MCS.

FIG. 21 is a flowchart illustrating another example of a method for transmitting downlink data in a measurement gap proposed in the present specification.

Referring to FIG. 21, it is possible to transmit MCS data to the UE in a measurement section by transmitting transmission information including a number of subframes of data to be transmitted to the UE in a measurement section.

First, steps S21010 to S21050 are the same as steps S20010 to S20050 of FIG. 20, and therefore, description thereof will be omitted.

The serving BS transmits the RRC connection reconfiguration message including information received from the alternative base stations (alternative base stations 1 and 2) and indication information transmitted from the MME to the UE through the step S21050 in order to notify the UE of the point related to the multilink connection setting, that is, the point that an alternative link has been set with the alternative base stations (alternative base stations 1 and 2) (S21060).

Thereafter, the UE transmits an RRC connection reconfiguration complete message to the serving BS indicating that the multi-link connection setup for the alternative BSs 1 and 2 is completed (S21070).

Upon receiving the connection reconfiguration completion message, the serving BS may transmit transmission information for transmitting the data of the MCS to the UE (S21080).

The transmission information may include section information of the MCS data, that is, the section information indicating the number of subframes during which the transmission is performed, and the time information indicating the transmission starting point of time of the data.

The UE receiving the transmission information can receive the data of the MCS without performing the inter-frequency measurement in the measurement gap (S21090).

As shown in FIG. 21, the serving base station continues to maintain the list of alternative base stations, and can update the list if necessary.

FIG. 21 shows an example of a method of setting up an alternative link between a UE and an alternative base station according to a network (MME) instruction when it is not necessary to synchronize the UE with the alternative base station. It can be applied even when the synchronization is necessary.

In addition, if downlink data transmission of the MCS is continued until the following measurement gap as well as the measurement gap set in the fourth SFN, the serving base station does not perform measurement in the number of measurement gaps capable of data transmission/reception, that is, the number of times of data transmission/reception without performing measurement in the measurement gap, can be transmitted to the UE.

At this time, the number of times can be included in the transmission information and transmitted.

FIG. 22 is a flowchart illustrating another example of a method for transmitting downlink data in a measurement gap proposed in the present specification.

Referring to FIG. 22, when the data to be transmitted in the measurement period is periodically transmitted, the MCS data can be transmitted to the UE in the measurement gap by transmitting the periodically transmitted time point to the UE.

First, steps S22010 to S22050 are the same as steps S20010 to S20050 of FIG. 20, and therefore, description thereof will be omitted.

Thereafter, the serving base station transmits RRC connection reconfiguration message including information received from the alternative base stations (alternative base stations 1 and 2), indication information received from the MME, and frame information indicating information of subframes in which the data is transmitted through the step S22050 in order to notify the UE that an alternative link has been set with the alternative base stations (alternative base stations 1 and 2), to thereby instruct the UE to receive downlink data without performing inter-frequency measurement at measurement gaps having been set in the SFN in advance (S22060).

The frame information may include pattern information indicating the SFN in which the data of the MCS is transmitted, and the point of time when the data is periodically transmitted when the data is periodically transmitted.

The RRC connection reconfiguration message may further include a Radio Bearer Quality of Service (QoS), Session Management Request information, and EPS RB ID information for notifying that the MCS Bearer is established.

The indication information and the time point at which the SFN is transmitted may be a time point at which the indication information and the SFN are transmitted and an interval required for receiving the ACK/NACK is not overlapped with the measurement gap.

Thereafter, the UE transmits an RRC connection reconfiguration complete message to the serving BS indicating that the multi-link connection setup for the alternative BSs 1 and 2 is completed (S22070).

If the indication information and the frame information are not included in the RRC connection reconfiguration message, the serving BS, which has transmitted information related to the alternative BS setup through the RRC connection reconfiguration completion message, may transmit transmission information for transmitting the data of MCS to the UE (S22080).

The transmission information may include duration information indicating a transmission duration of data of the MCS, i.e., a number of subframes during which the data is transmitted, and time information indicating a transmission start time of the data.

In addition, when the frame information does not include the pattern information, the transmission information may include the pattern information.

The UE receiving the transmission information can receive the data of the MCS without performing the inter-frequency measurement in the measurement gap (S22090).

As shown in FIG. 22, the serving base station continues to maintain the list of alternative base stations, and can update the corresponding list as needed.

FIG. 22 shows an example of a method of setting up an alternative link between a UE and an alternative base station according to a network (MME) instruction when there is no need to synchronize the UE and the alternative base station. It can be applied even when synchronizaton is necessary.

In addition, if downlink data transmission of the MCS continues until the next measurement gap as well as the measurement gap set in the fourth SFN, the serving base station may transmit the number of measurement gaps capable of data transmission/reception, i.e., the number of times of data transmission/reception to the UE without performing measurement in the measurement gap.

At this time, the number of times may be included in the frame information or the transmission information and transmitted.

FIG. 23 is a flowchart illustrating another example of a method for transmitting uplink data in the measurement gap proposed in the present specification.

Referring to FIG. 23, a UE receiving indication information for permitting transmission and reception of data in a measurement gap can transmit the data to a BS in a measurement gap by informing the BS of MCS data when the MCS data is generated.

First, steps S23010 to S23050 are the same as steps 20010 to S20050 of FIG. 20, and thus the description will be omitted.

Thereafter, the serving base station transmits RRC connection reconfiguration message including information received from the alternative base stations (alternative base stations 1 and 2), indication information received from the MME, and frame information indicating information of subframes in which the data is transmitted through the step S22050 in order to notify the UE that an alternative link has been set with the alternative base stations (alternative base stations 1 and 2), to thereby instruct the UE to receive downlink data without performing inter-frequency measurement at measurement gaps having been set in the SFN in advance (S23060).

The RRC connection reconfiguration message may further include a Radio Bearer Quality of Service (QoS), Session Management Request information, and EPS RB ID information for notifying that the MCS Bearer has been set.

Then, the UE transmits an RRC connection reconfiguration complete message to the serving BS indicating that the multi-link connection setup for the alternative BSs 1 and 2 is completed (S23070).

It can be seen that the UE can transmit data without measuring if the MCS data is to be transmitted in the measurement gap through the first indication information.

Thereafter, if the data of MCS to be transmitted to the BS in the measurement section is generated, the UE may transmit second indication information indicating that the data is generated to the BS and transmission information for transmission of the data (S23080).

At this time, the indication information may be included in a Scheduling Request (SR) to be transmitted to the base station, and may be transmitted in the interval where the section required for transmission of the SR, reception of the UL Grant, transmission of the PUSCH, and reception of the PHICH is not overlapped with the measurement gap.

For example, in FIG. 18, when the measurement gap is set to the fourth SFN (43 to 48 subframes) and the uplink data is to be transmitted in the measurement gap, the indication information and the point of time when SFN is transmitted may be selected among 9 to 42 subframes (after transmission of SR and reception of UL grant, when uplink data transmission according to the indication information and SFN transmission, and ACK/NACK reception are possible within 34 ms).

The UE transmitting the SR may transmit the data of the MCS to the BS without performing the inter-frequency measurement in the measurement gap (S23090).

In another embodiment of the present invention, after transmitting the SR, the UE may transmit transmission information for transmission of the data to the BS, not perform Inter-Frequency measurement in the measurement gap, and transmit data of MCS to the base station.

The transmission information may include duration information indicating a transmission duration of data of the MCS, i.e., a number of subframes during which the data is transmitted, and time information indicating a transmission start time of the data.

FIG. 24 is a block diagram illustrating a wireless device by which the methods proposed in the specification may be implemented.

Here, the wireless device may be a network entity, a base station, a terminal, etc., and the base station includes both a macro base station and a small base station.

As shown in FIG. 24, a base station 10 and a UE 20 each includes a processor 2411 and 2421, memory 2412 and 2422, and an RF unit (a transmission/reception unit and a communication unit) 2413 and 2423.

Besides, the base station and the UE each may further include an input unit and an output unit.

The RF unit 2413 and 2423, the processor 2411 and 2421, the input unit, the output unit, and the memory 2412 and 2422 are functionally connected to perform the methods proposed in the present specification.

The RF unit 2413 and 2423 receives information produced by a physical layer (PHY) protocol, moves the received information to an RF (radio frequency) spectrum, performs filtering and amplification on the information, and sends it by an antenna. Furthermore, the communication unit moves an RF signal, received from the antenna, to a band that may be processed in the PHY protocol and performs filtering on the RF signal.

Furthermore, the communication unit may have a switch function for switching between such transmission and reception functions.

The processor 2411 and 2421 implements the functions, processes and/or methods proposed in this specification. The layers of a radio interface protocol may be implemented by the processor.

The processor may be represented as a control part, a controller, control unit, or a computer.

The memory 2412 and 2422 is connected to the processor and stores protocols or parameters for performing the methods proposed in this specification.

The processor 2411 and 2421 may include application-specific integrated circuits (ASICs), other chipsets, logic circuits and/or data processing devices. The memory may include read-only memory (ROM), random access memory (RAM), flash memory, a memory card, a storage medium and/or other storage devices. The communication unit may include baseband circuits for processing radio signals. When an embodiment is implemented in software, the method may be implemented as a module (process or function) for performing the functions.

The module may be stored in the memory and may be executed by the processor. The memory may be placed inside or outside the processor and may be connected to the processor by well-known means.

The output unit (or display unit) is controlled by the processor and outputs information output by the processor along with a key entry signal generated from a key input unit and various information signals from the processor.

Furthermore, the drawings have been divided and described for convenience of description, but the embodiments described with reference to the drawings may be merged to implement a new embodiment(s). Furthermore, the scope of the present invention also includes designing a computer-readable recording medium in which a program for executing the aforementioned embodiments has been written according to the needs of those skilled in the art.

The methods proposed in this specification are not limited and applied to the configurations and methods of the aforementioned embodiments, but some or all of the embodiments may be selectively combined and configured so that the embodiments are modified in various ways.

In this specification, the methods proposed in the present specification may be implemented in a recording medium, readable by a processor included in a network device, in the form of code readable by the processor. The processor-readable recording medium includes all types of recording devices in which data readable by a processor is stored. The processor-readable recording medium may include ROM, RAM, CD-ROM, magnetic tapes, floppy disks, and optical data storages, for example. Furthermore, the processor-readable recording medium may be implemented in the form of carrier waves, such as transmission over the Internet.

Furthermore, the processor-readable recording medium may be distributed to computer systems connected over a network, and processor-readable codes may be stored in the processor-readable recording medium and executed in a distributed manner.

The above-described present disclosure is not limited to the foregoing exemplary embodiments and the accompanying drawings, and it is apparent to the person skilled in the art that various substitutions, modifications, and alterations may be possible without departing from the technical spirit of the present disclosure.

INDUSTRIAL APPLICABILITY

While an RRC connection method in a wireless communication system according to the present invention has been described with respect to an example that is applicable to 3GPP LTE/LTE-A systems, it may be applied to various wireless communication systems, apart from the 3GPP LTE/LTE-A systems.

The invention claimed is:

1. A method of transmitting and receiving data performed by a base station in a wireless communication system, the method comprising:
receiving a request message for requesting setting of an E-UTRAN radio access bearer (E-RAB) for data transmission and reception of a mission critical service (MCS) from a network node,
wherein, when a MCS data is generated in at least one first measurement gap, the request message includes indication information which allows transmission and reception of the data in the at least one first measurement gap; and
transmitting, to a user equipment (UE), at least one of the indication information or measurement gap information associated with the at least one first measurement gap in which the data is transmitted; and
transmitting the data to the UE in the at least one first measurement gap.

2. The method of claim 1, wherein the UE receives the data without measuring neighboring cells and frequencies in the at least one first measurement gap.

3. The method of claim 1, wherein the measurement gap information includes at least one of system frame number (SFN) information on which the data is transmitted, information on a number of the at least one first measurement gap for transmitting the data, and pattern information indicating transmission time when the data is periodically transmitted.

4. The method of claim 1, further comprising:
transmitting transmission information including transmission information related to transmission of the data to the UE,
wherein the transmission information includes at least one of time information indicating a transmission start time of the data, duration information indicating a transmission duration of the data, or pattern information indicating transmission time when the data is periodically transmitted.

5. The method according to claim 1, further comprising:
transmitting, to at least one candidate base station, a setting request message requesting setting of an alternative link with the UE; and
receiving a setting response message in response to the setting request message from the at least one candidate base station,
wherein the request message includes first indication information indicating an alternative link setting between the UE and the at least one candidate base station.

6. The method of claim 5, wherein the setting request message includes second indication information instructing to inactivate a signaling radio bearer (SRB) status of the alternative link.

7. The method of claim 1, wherein at least one of the indication information or the measurement gap information is transmitted through a radio resource control (RRC) connection reconfiguration message.

8. A method of transmitting and receiving data performed by a base station in a wireless communication system, the method comprising:
receiving a request message requesting setting of an E-UTRAN radio access bearer (E-RAB) for data transmission and reception of a mission critical service (MCS) from a network node,
wherein, when MCS data is generated in at least one first measurement gap, the request message includes indication information which allows transmission and reception of the data in the at least one first measurement gap;
transmitting the first indication information to user equipment (UE);
receiving, from the UE, second indication information indicating generation of uplink data of the MCS to be transmitted in the at least one first measurement gap; and
receiving the uplink data from the UE in the at least one measurement gap.

9. The method of claim 8, wherein the UE receives the data without measuring neighboring cells and frequencies in the at least one first measurement gap.

10. The method of claim 8, further comprising:
receiving transmission information for transmission of the uplink data from the UE,
wherein the transmission information includes at least one of time information indicating a transmission start time point of the uplink data, information on a number of the at least one first measurement gap for transmitting the uplink data, and duration information indicating a transmission duration of the uplink data.

11. A base station for transmitting and receiving data in a wireless communication system, the base station comprising:
- a communication unit configured to transmit and receive a radio signal with an external side; and
- a processor configured to be coupled to the communication unit functionally,
- wherein the processor is further configured to:
- receive a request message requesting setting of E-UTRAN radio access bearer (E-RAB) for data transmission and reception of a mission critical service (MCS) from a network node,
- wherein, when MCS data is generated in at least one first measurement gap, the request message includes indication information which allows transmission and reception of the data in the measurement gap;
- transmit, to a user equipment (UE), at least one of the indication information or measurement gap information associated with the at least one first measurement gap in which the data is transmitted; and
- transmit the data to the UE in the at least one first measurement gap.

* * * * *